United States Patent
Marvin et al.

(10) Patent No.: US 8,484,664 B2
(45) Date of Patent: *Jul. 9, 2013

(54) SYSTEMS AND METHODS FOR AN EXTENSIBLE SOFTWARE PROXY

(75) Inventors: Kyle W. Marvin, Kingwood, TX (US); David Bau, III, Gladwyne, PA (US); Roderick A. Chavez, Kirkland, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/195,284

(22) Filed: Aug. 1, 2011

(65) Prior Publication Data

US 2011/0289477 A1 Nov. 24, 2011

Related U.S. Application Data

(62) Division of application No. 11/734,239, filed on Apr. 11, 2007, now Pat. No. 8,015,572, which is a division of application No. 10/233,118, filed on Aug. 30, 2002, now Pat. No. 7,516,447.

(60) Provisional application No. 60/359,409, filed on Feb. 22, 2002.

(51) Int. Cl.
*G06F 3/00* (2006.01)
*G06F 15/16* (2006.01)

(52) U.S. Cl.
USPC .............................. 719/320; 719/330; 726/12

(58) Field of Classification Search
None
See application file for complete search history.

(56) References Cited

U.S. PATENT DOCUMENTS

| | | | |
|---|---|---|---|
| 5,321,841 A | 6/1994 | East et al. |
| 5,469,562 A | 11/1995 | Saether |
| 5,475,817 A | 12/1995 | Waldo et al. |
| 5,604,860 A | 2/1997 | McLaughlin et al. |
| 5,630,131 A | 5/1997 | Palevich et al. |
| 5,642,511 A | 6/1997 | Chow et al. |
| 5,724,588 A | 3/1998 | Hill et al. |

(Continued)

FOREIGN PATENT DOCUMENTS

| | | |
|---|---|---|
| CA | 2248634 | 3/2000 |
| WO | WO 9923558 | 5/1999 |

(Continued)

OTHER PUBLICATIONS

Lauer, Christopher, "Introducing Microsoft DotNet", Techmetrix Research, Jul. 2, 2002; http://web.archive.org/web/20020702162429/http://www.freevbcode.com/ShowCode.asp?ID=2171, Oct. 22, 2004, 10 pgs.

(Continued)

*Primary Examiner* — H S Sough
*Assistant Examiner* — Carina Yun
(74) *Attorney, Agent, or Firm* — Miles & Stockbridge P.C.

(57) ABSTRACT

A system and method for creating a proxy object capable of communication with an external entity, comprising specifying a proxy object definition for the proxy object wherein the proxy object definition defines a first function for communicating with the external entity, specifying at least one implementation class for the proxy object definition, wherein the at least one implementation class does not implement the first function, and wherein the at least one implementation class includes functionality to support one of: proxy object design, software compilation and software execution.

23 Claims, 16 Drawing Sheets

U.S. PATENT DOCUMENTS

| | | | |
|---|---|---|---|
| 5,748,960 A * | 5/1998 | Fischer | 719/316 |
| 5,748,975 A | 5/1998 | Van de Vanter | |
| 5,801,958 A | 9/1998 | Dangelo et al. | |
| 5,835,769 A | 11/1998 | Jervis et al. | |
| 5,836,014 A | 11/1998 | Faiman, Jr. | |
| 5,862,327 A | 1/1999 | Kwang | |
| 5,867,822 A | 2/1999 | Sankar | |
| 5,903,725 A | 5/1999 | Colyer | |
| 5,944,794 A | 8/1999 | Okamoto et al. | |
| 5,950,010 A | 9/1999 | Hesse | |
| 5,961,593 A | 10/1999 | Gabber et al. | |
| 5,966,535 A | 10/1999 | Benedikt et al. | |
| 6,012,083 A | 1/2000 | Savitzky et al. | |
| 6,016,495 A | 1/2000 | McKeehan et al. | |
| 6,018,730 A | 1/2000 | Nichols et al. | |
| 6,023,578 A | 2/2000 | Birsan et al. | |
| 6,023,722 A | 2/2000 | Colyer | |
| 6,028,997 A | 2/2000 | Leymann | |
| 6,029,000 A | 2/2000 | Woolsey et al. | |
| 6,044,217 A | 3/2000 | Brealey et al. | |
| 6,067,548 A | 5/2000 | Cheng | |
| 6,067,623 A | 5/2000 | Blakley et al. | |
| 6,070,184 A | 5/2000 | Blount et al. | |
| 6,092,102 A | 7/2000 | Wagner | |
| 6,119,149 A | 9/2000 | Notani | |
| 6,141,686 A | 10/2000 | Jackowski | |
| 6,141,701 A | 10/2000 | Whitney | |
| 6,182,155 B1 | 1/2001 | Cheng et al. | |
| 6,212,546 B1 | 4/2001 | Starkovich et al. | |
| 6,222,533 B1 | 4/2001 | Notani | |
| 6,226,675 B1 | 5/2001 | Meltzer et al. | |
| 6,226,690 B1 | 5/2001 | Banda et al. | |
| 6,230,287 B1 | 5/2001 | Pinard et al. | |
| 6,230,309 B1 | 5/2001 | Turner | |
| 6,237,135 B1 | 5/2001 | Timbol | |
| 6,243,737 B1 | 6/2001 | Flanagan et al. | |
| 6,253,252 B1 | 6/2001 | Schofield | |
| 6,282,711 B1 | 8/2001 | Halpern | |
| 6,292,932 B1 | 9/2001 | Baisley et al. | |
| 6,311,327 B1 | 10/2001 | O'Brien et al. | |
| 6,324,681 B1 | 11/2001 | Sebesta | |
| 6,330,569 B1 | 12/2001 | Baisley et al. | |
| 6,334,114 B1 | 12/2001 | Jacobs et al. | |
| 6,338,064 B1 | 1/2002 | Ault et al. | |
| 6,343,265 B1 | 1/2002 | Glebov et al. | |
| 6,345,382 B1 | 2/2002 | Hughes | |
| 6,349,408 B1 | 2/2002 | Smith | |
| 6,353,923 B1 | 3/2002 | Bogle et al. | |
| 6,360,358 B1 | 3/2002 | Elsbree et al. | |
| 6,367,068 B1 | 4/2002 | Vaidyanathan et al. | |
| 6,377,939 B1 | 4/2002 | Young | |
| 6,385,661 B1 | 5/2002 | Guthrie et al. | |
| 6,393,481 B1 * | 5/2002 | Deo et al. | 709/224 |
| 6,393,605 B1 | 5/2002 | Loomans | |
| 6,408,311 B1 | 6/2002 | Baisley et al. | |
| 6,411,698 B1 | 6/2002 | Bauer et al. | |
| 6,445,711 B1 | 9/2002 | Scheel et al. | |
| 6,470,364 B1 | 10/2002 | Prinzing | |
| 6,510,550 B1 * | 1/2003 | Hightower et al. | 717/108 |
| 6,516,322 B1 | 2/2003 | Meredith | |
| 6,549,949 B1 | 4/2003 | Bowman-Amuah | |
| 6,560,769 B1 | 5/2003 | Moore et al. | |
| 6,567,738 B2 | 5/2003 | Gopp et al. | |
| 6,578,191 B1 | 6/2003 | Boehme et al. | |
| 6,584,454 B1 | 6/2003 | Hummel et al. | |
| 6,594,693 B1 | 7/2003 | Borwankar | |
| 6,594,700 B1 | 7/2003 | Graham et al. | |
| 6,601,113 B1 | 7/2003 | Koistinen et al. | |
| 6,604,198 B1 | 8/2003 | Beckman et al. | |
| 6,609,115 B1 | 8/2003 | Mehring et al. | |
| 6,615,258 B1 | 9/2003 | Barry et al. | |
| 6,636,491 B1 | 10/2003 | Kari et al. | |
| 6,637,020 B1 | 10/2003 | Hammond | |
| 6,643,652 B2 | 11/2003 | Helgeson et al. | |
| 6,654,932 B1 | 11/2003 | Bahrs et al. | |
| 6,678,518 B2 | 1/2004 | Eerola | |
| 6,684,388 B1 | 1/2004 | Gupta et al. | |
| 6,687,702 B2 | 2/2004 | Vaitheeswaran et al. | |
| 6,687,848 B1 | 2/2004 | Najmi | |
| 6,721,740 B1 | 4/2004 | Skinner et al. | |
| 6,721,779 B1 | 4/2004 | Maffeis | |
| 6,732,237 B1 | 5/2004 | Jacobs et al. | |
| 6,735,771 B1 | 5/2004 | Houlding | |
| 6,748,420 B1 | 6/2004 | Quatrano et al. | |
| 6,754,884 B1 | 6/2004 | Lucas et al. | |
| 6,757,689 B2 | 6/2004 | Battas et al. | |
| 6,789,054 B1 | 9/2004 | Maklouf | |
| 6,795,967 B1 | 9/2004 | Evans et al. | |
| 6,799,718 B2 | 10/2004 | Chan et al. | |
| 6,802,000 B1 | 10/2004 | Greene et al. | |
| 6,804,686 B1 | 10/2004 | Stone et al. | |
| 6,823,495 B1 | 11/2004 | Vedula et al. | |
| 6,832,238 B1 | 12/2004 | Sharma et al. | |
| 6,836,883 B1 | 12/2004 | Abrams et al. | |
| 6,847,981 B2 | 1/2005 | Song et al. | |
| 6,850,979 B1 | 2/2005 | Saulpaugh et al. | |
| 6,859,180 B1 | 2/2005 | Rivera | |
| 6,874,143 B1 | 3/2005 | Murray et al. | |
| 6,877,163 B1 | 4/2005 | Jones et al. | |
| 6,889,244 B1 | 5/2005 | Gaither et al. | |
| 6,895,444 B1 | 5/2005 | Weisshaar et al. | |
| 6,901,588 B1 | 5/2005 | Krapf et al. | |
| 6,915,519 B2 | 7/2005 | Williamson et al. | |
| 6,918,084 B1 | 7/2005 | Slaughter et al. | |
| 6,918,088 B2 | 7/2005 | Clark et al. | |
| 6,922,827 B2 | 7/2005 | Vasilik et al. | |
| 6,950,872 B2 | 9/2005 | Todd, II | |
| 6,959,307 B2 | 10/2005 | Apte | |
| 6,963,914 B1 | 11/2005 | Breitbart et al. | |
| 6,971,096 B1 | 11/2005 | Ankireddipally et al. | |
| 6,976,086 B2 | 12/2005 | Sadeghi et al. | |
| 6,993,774 B1 | 1/2006 | Glass | |
| 7,000,219 B2 | 2/2006 | Barrett et al. | |
| 7,017,146 B2 | 3/2006 | Dellarocas et al. | |
| 7,043,722 B2 | 5/2006 | Bau, III | |
| 7,051,072 B2 | 5/2006 | Stewart et al. | |
| 7,051,316 B2 | 5/2006 | Charisius et al. | |
| 7,054,858 B2 | 5/2006 | Sutherland | |
| 7,062,718 B2 | 6/2006 | Kodosky et al. | |
| 7,065,771 B1 | 6/2006 | Prabhu et al. | |
| 7,069,507 B1 | 6/2006 | Alcazar et al. | |
| 7,072,934 B2 | 7/2006 | Helgeson et al. | |
| 7,073,167 B2 | 7/2006 | Iwashita | |
| 7,076,772 B2 | 7/2006 | Zatloukal | |
| 7,096,422 B2 | 8/2006 | Rothschiller et al. | |
| 7,107,578 B1 | 9/2006 | Alpern | |
| 7,111,243 B1 | 9/2006 | Ballard et al. | |
| 7,117,504 B2 | 10/2006 | Smith et al. | |
| 7,127,704 B2 | 10/2006 | Van De Vanter et al. | |
| 7,143,186 B2 | 11/2006 | Stewart et al. | |
| 7,146,422 B1 | 12/2006 | Marlatt et al. | |
| 7,155,705 B1 | 12/2006 | Hershberg et al. | |
| 7,165,041 B1 | 1/2007 | Guheen et al. | |
| 7,181,731 B2 | 2/2007 | Pace et al. | |
| 7,184,967 B1 | 2/2007 | Mital et al. | |
| 7,240,331 B2 | 7/2007 | Vion-Dury et al. | |
| 7,260,599 B2 | 8/2007 | Bauch et al. | |
| 2001/0052111 A1 | 12/2001 | Scott | |
| 2002/0004848 A1 | 1/2002 | Sudarshan et al. | |
| 2002/0010781 A1 | 1/2002 | Tuatini | |
| 2002/0010803 A1 | 1/2002 | Oberstein et al. | |
| 2002/0016759 A1 | 2/2002 | Macready et al. | |
| 2002/0035604 A1 | 3/2002 | Cohen et al. | |
| 2002/0049603 A1 | 4/2002 | Mehra et al. | |
| 2002/0073080 A1 | 6/2002 | Lipkin | |
| 2002/0073396 A1 | 6/2002 | Crupi et al. | |
| 2002/0078365 A1 | 6/2002 | Burnett et al. | |
| 2002/0083075 A1 | 6/2002 | Brummel et al. | |
| 2002/0111922 A1 | 8/2002 | Young et al. | |
| 2002/0120685 A1 | 8/2002 | Srivastava et al. | |
| 2002/0143960 A1 | 10/2002 | Goren et al. | |
| 2002/0152106 A1 | 10/2002 | Stoxen et al. | |
| 2002/0161826 A1 | 10/2002 | Arteaga et al. | |
| 2002/0165936 A1 | 11/2002 | Alston et al. | |
| 2002/0169644 A1 | 11/2002 | Greene | |
| 2002/0174178 A1 | 11/2002 | Stawikowski | |
| 2002/0174241 A1 | 11/2002 | Beged-Dov et al. | |

| | | | |
|---|---|---|---|
| 2002/0174262 | A1 | 11/2002 | Marcos et al. |
| 2002/0184610 | A1 | 12/2002 | Chong et al. |
| 2002/0188486 | A1 | 12/2002 | Gil et al. |
| 2002/0194244 | A1 | 12/2002 | Ravetos |
| 2002/0194267 | A1 | 12/2002 | Flesner et al. |
| 2002/0194495 | A1 | 12/2002 | Gladstone et al. |
| 2003/0004746 | A1 | 1/2003 | Kheirolomoom et al. |
| 2003/0005181 | A1 | 1/2003 | Bau, III et al. |
| 2003/0014439 | A1 | 1/2003 | Boughannam |
| 2003/0018661 | A1 | 1/2003 | Darugar |
| 2003/0018665 | A1 | 1/2003 | Dovin et al. |
| 2003/0018832 | A1 | 1/2003 | Amirisetty et al. |
| 2003/0018963 | A1 | 1/2003 | Ashworth et al. |
| 2003/0023957 | A1 | 1/2003 | Bau et al. |
| 2003/0028579 | A1 | 2/2003 | Kulkarni et al. |
| 2003/0041198 | A1 | 2/2003 | Exton et al. |
| 2003/0043191 | A1 | 3/2003 | Tinsley et al. |
| 2003/0046266 | A1 | 3/2003 | Mullins |
| 2003/0046591 | A1 | 3/2003 | Asghari-Kamrani et al. |
| 2003/0051066 | A1 | 3/2003 | Pace et al. |
| 2003/0055868 | A1 | 3/2003 | Fletcher et al. |
| 2003/0055878 | A1 | 3/2003 | Fletcher et al. |
| 2003/0056204 | A1* | 3/2003 | Broussard ..................... 717/140 |
| 2003/0074217 | A1 | 4/2003 | Beisiegel et al. |
| 2003/0079029 | A1 | 4/2003 | Garimella et al. |
| 2003/0084203 | A1 | 5/2003 | Yoshida et al. |
| 2003/0093471 | A1 | 5/2003 | Upton |
| 2003/0110117 | A1 | 6/2003 | Saidenberg et al. |
| 2003/0110312 | A1 | 6/2003 | Gunduc et al. |
| 2003/0110446 | A1 | 6/2003 | Nemer |
| 2003/0126136 | A1 | 7/2003 | Omoigui |
| 2003/0149791 | A1 | 8/2003 | Kane et al. |
| 2003/0167358 | A1 | 9/2003 | Marvin et al. |
| 2003/0196168 | A1 | 10/2003 | Hu |
| 2004/0019645 | A1 | 1/2004 | Goodman et al. |
| 2004/0040011 | A1 | 2/2004 | Bosworth et al. |
| 2004/0078373 | A1 | 4/2004 | Ghoneimy et al. |
| 2004/0133660 | A1 | 7/2004 | Junghubert et al. |
| 2004/0139018 | A1 | 7/2004 | Anderson et al. |
| 2004/0148336 | A1 | 7/2004 | Hubbard et al. |
| 2004/0204976 | A1 | 10/2004 | Oyama et al. |
| 2004/0216086 | A1 | 10/2004 | Bau |
| 2004/0225995 | A1 | 11/2004 | Marvin et al. |
| 2004/0260715 | A1 | 12/2004 | Mongeon et al. |
| 2005/0050068 | A1 | 3/2005 | Vaschillo et al. |
| 2005/0278585 | A1 | 12/2005 | Spencer |
| 2006/0206856 | A1 | 9/2006 | Breeden et al. |
| 2006/0234678 | A1 | 10/2006 | Juitt et al. |
| 2007/0038500 | A1 | 2/2007 | Hammitt et al. |
| 2007/0199002 | A1 | 8/2007 | Marvin et al. |

FOREIGN PATENT DOCUMENTS

| | | |
|---|---|---|
| WO | WO 0029924 A | 5/2000 |
| WO | WO 0152054 | 7/2001 |
| WO | WO 0190884 A2 | 11/2001 |

OTHER PUBLICATIONS

Paul, Laura Gibbons, "RosettaNet: Teaching Busiensses to Work Together", Oct. 1, 1999; http//www.developer.com/xml/print.php/616641, Jan. 4, 2005, 4 pgs.

Kunisetty, Sunil, "Workflow Modeling and Simulation Using an Extensible Object-Oriented Knowledge Base Management System", Database Research and Development Center, University of Florida, Gainsville, FL, CiteSeer, 1996, pp. 1-60.

Van Der Allst, et al., Verification of XRL: An XML-Based Workflow language, Faculty of Technology and Management, Eindhoven University of Technology, Eindhoven, The Netherlands, Computer Supported Cooperative Work in Design. The Sixth International Conference, IEEE, Jul. 2001, pp. 427-432 (6 pgs.).

Dahalin, et al., "Workflow Interoperability Using Extensible Markup Language (XML)", School of Informtion Technology, Universiti Utara Malaysia, Sintok Kedah, Malaysia, Jul. 2002, Copyright 2002 IEEE, pp. 513-516 (4 pgs.).

Blake, M. Brian, Rule-Driven Coordination Agents: A Self-Configurable Agent Architecture for Distributed Control, Department of Computer Science, Georgetown University, Washington, DC, Copyright 2001 IEEE, Mar. 2001, pp. 271-277 (7 pgs.).

Liebmann, Erich et al., "Adaptive Data Dissemination and Caching for Edge Service Architectures Built with the J2EE", Distributed Systems Group, Information Systems Institute, Vienna University of Technology, Vienna Austria, Mar. 2004, Copyright 2004 ACM Press 2004 ACM Symposium on Applied Computing, pp. 1717-1724 (8 pgs.).

Mariucci, Marcello, "Enterprise Application Server Development Environment", Overview, University Stuttgart, Stuttgart, DE, 1010-2000, pp. 1-30.

Sun Microsystems, "Iplanet Application Server 6.0 White Paper", Technical Reference Guide, May 25, 2000, 106 pgs.

Roman, Ed, et al., "The Technical Benefits of EJB and J2EE Technologies Over COM+ and Windows DNA", The Middleware Company, Dec. 1999, Copyright 1999, The Middleware Company, pp. 3-5, fig. 1 (24 pgs.).

Hewlett-Packard, "HP Application Server", Technical Guide Version 8.0, 1999-2001 (245 pgs.).

Duvos, Enrique, et al., "An infrastructure for the Dynamic Distribution of Web Applications and Services", Department of Computer Science, Boston University, Boston MA, Dec. 2000, pp. 4-12 (22 pgs.).

International Search Report, PCT/US04/05479, mailed Dec. 3, 2004, 8 pgs.

International Search Report, PCT/US04/05427, mailed Feb. 10, 2005, 12 pgs.

International Search Report, PCT/US04/05488, mailed Mar. 1, 2005, 3 pgs.

International Search Report, PCT/US04/05622, mailed Mar. 15, 2005, 4 pgs.

Supplementary European Search Report, EP02784131.1-1243-PCT/US/0233098, dated Aug. 8, 2007, 4 pgs.

Silva, Antonio Rito, et al., "Distributed Proxy: A Design Pattern for Distributed Object Communication", INESC/IST Technical University of Lisbon, Rua Alves Redol No. 9, 1000 Lisboa, Portual, Sep. 1997, pp. 1-8.

Gamma, Erich, et al., "Design Patterns: Elements of Reusable Object-Oriented Software", Copyright 1995 by Addison-Wesley Publishing Co., 13 pgs.

Sosnoski, "XML and Java Technologies: Data Binding, Part 1: Code Generation Approaches—JAXB and More", IBM, Jan. 1, 2003, pp. 1-11; http://www-128.ibm.com/developerworks/library/x-databdopt/index.html.

Chen, et al., "eCo Architecture for Electronic Commerce Interoperability", CommerceNet Framework Project, Jun. 29, 1999, Copyright 1999 by CommerceNet, Inc., pp. 1-107.

Embury, S.M., et al., "Assisting the Comprehension of Legacy Transactions", Proceedings of the Eighth Working Conference on Reverse Engineering, Oct. 2-5, 2001, Copyright 2001 IEEE, pp. 345-354.

Mays, E., et al., "A Persistent Store for Large Shared Knowledge Bases", IEEE Transactions on Knowledge and Data Engineering, Mar. 1991, vol. 3, Issue 1, Copyright 1991, pp. 33-41.

Tang, C., et al., "Integrating Remote Invocation and Distributed Shared State", Proceedings of the 18th International Parallel and Distributed Processing Symposium, (IPDPS '04), Copyright IEEE, Apr. 26-30, 2004, 10 pgs.

JAVA Debug Interface-definition, retrieved from URL; http://java.sun.com/j2se/1.4.2/docs/guide/jpda/jdi/overview-summary.html on Feb. 21, 2007, pp. 1-3.

Kilgore, R.A., "Multi-Language, Open-Source Modeling Using the Microsoft.Net Architecture", Proceedings of the Winter Simulation Conference, Dec. 8-11, 2002, Copyright 2006, IEEE, pp. 629-633.

Bugunovic, N., "A Programming Model for Composing Data-Flow Collaborative Applications", R. Boskovic Institute, Zagreb, 10000, Croatia, IEEE, Mar. 1999, 7 pgs., retrieved Apr. 10, 2007.

Sung, S.Y., et al., "A Multimedia Authoring Tool for the Internet", Copyright 1997 IEEE, pp. 304-308, retrieved Apr. 10, 2007.

Smith, M., et al., "Marching Towards a Software Reuse Future", ACM Ada Letters, vol. XIV, No. 6, Nov./Dec. 1994, pp. 62-72, retrieved Apr. 10, 2007.

Mohan, C., et al., "ARIES: A Transaction Recovery Method Supporting Fine-Granularity Locking and Partial Rollbacks Using Write-Ahead Logging", Copyright 1992, ACM Transactions on Database Systems, vol. 17, No. 1, Mar. 1992, pp. 94-162.

Bea, "Transforming Data Using Xquery Mapper", Bea AquaLogic Service Bus. 2.0 Documentation, 2006, pp. 1-19.

Stylus Studio, "Xquery Mapper", Stylus Studio, Jun. 5, 2007, pp. 1-6; http://www.stylusstudio.com/xquery mapper.html.

Altova, "XML-to-XML Mapping", Altova MapForce, 2007, pp. 1-3.

Jamper, Jamper-Java XML Mapper, Sourceforge.Net, Jun. 6, 2007, pp. 1-4; http://jamper.sourceforge.net/.

Microsoft, "Microsoft.net Framework", Microsoft Corporation, 2001, 54 pgs.

Willink, "Meta-Compilation for C++", University of Surrey, Jan. 4, 2000, 379 pgs.

Alonso, G., et al., "Advanced Transaction Models in Workflow Copntexts", Proceedings of the 12th International Conference on Data Engineering, Feb. 1996, retrieved from: http://citeseer.ist.psu.edu/alonso96advanced.html, 8 pgs.

Van Der Alst, WMP, et al., "XML Based Schema Definition for Support of Inter-organizational Workflow", University of Colorado and University of Eindhoven report, 2000, retrieved from: http://citeseer.ist.psu.edu/vanderaalst00xml.html, 39 pgs.

Plaindoux, D., "XML Transducers in Java", Proceedings of the 11th International World Wide Web Conference, Sheraton Waikiki Hotel, Honolulu, HI, USA, May 2002, retrieved from: http://www2002.org/CDROM/poster/132/index.html, 6 pgs.

Allamaraju, et al., "Professional Java Server Programming J2EE 1.3 Edition", WROX, XP002442953, ISBN: 1-861005-37-7, Sep. 2001, pp. 1009-1057.

Sun Microsystems: "J2EE Connector Architecture 1.0", XP-002442954, Aug. 2001; retrieved from: http://java.sun.com/j2ee/connector/download.html, 188 pgs.

Ort et al., "Java Architecture for XML Binding (JAXB)", Sun Microsystems, Inc. Mar. 2003, retrieved from; http://java.sun.com/developer/technical/articles/WebServices/jaxb, pp. 1-14.

Wikipedia (redirected from JAXB), "Java Architecture for XML Binding (JAXB)", Oct. 12, 2007, pp. 1-3.

Shannon, "Java 2 Platform Enterprise Edition Specification, v1.3", Sun Microsystems, Inc., Proposed Final Draft Oct. 20, 2000, Chapters 1-11, 170 pgs.

* cited by examiner

```
package com.bea.jws;

/**
 * @implementation         ~ 510
 *     runtime       ="com.bea.jws.private.TimerImpl"        ~ 512
 *     compiletime   ="com.bea.jws.private.TimerValidator"   ~ 514
 *     designtime    ="com.bea.jws.private.TimerDesigner"    ~ 516
 */
interface Timer extends com.bea.jws.ProxyObject    ~ 502
{
    void setTimeoutIn(int milliseconds);      ~ 504a
    void setTimeoutAt(java.util.Date date);   ~ 504b java.util.Date getTimeoutAt();
    long getTimeoutIn();

long clearTimeout();

static public interface Callback
    {
        void onTimeout();          ~ 504c
    }
}
```

```
<syntax>
<property name="sql" onMethod="yes">               ~702a
  <attribute name="statement" required="yes"/>     ~704a
  <attribute name="maxCount">                      ~704b
    <type><integer/></type>                        ~706
    <default>+infinity</default>                   ~708
  </attribute>
  <attribute name="returnType"/>                   ~704c
</property>
<property name="pool" onDecl="optional" onDef="optional" onFunc="optional">  ~702b
  <attribute name="name" required="yes"/>
</property>
</syntax>
```

Figure 7

```
/**
 * @timer           ~ 902
 */
com.bea.jws.Timer theTimer;
```

Figure 9a

```
/**
 * @timer timeoutIn="30 sec"   ~ 904
 */
com.bea.jws.Timer theTimer;    ~ 902
```

Figure 9b

```
void theTimer_onTimeout(long t)      ~ 906
{
    System.out.println("Timeout at " + t);
}
```

Figure 9c

```
/**
 * StandardTimer.ctrl
 *
 * @timer timeoutIn="30 sec"    ~1004
 */
interface StandardTimer extends com.bea.jws.Timer    ~1002
{
}
```

Figure 10a

```
/**
 * EmployeeDB.ctrl                    1020
 */
public interface EmployeeDB extends com.bea.jws.Database
{
    public class EmployeeRecord                              ~1022
    {
        String name;                                          ~1024
        long salary;
    }

/**
     * Port level resource attributes, such as the SQL associated
     * with the port, parameter maps, etc.
     *
     * @sql statement="SELECT NAME, SALARY FROM EMPS WHERE ID = {id}"  ~1026
     */
    EmployeeRecord getEmployeeData(int id) throws SQLException;   ~1028
}
```

Figure 10b

```
/**
 * @jws:control
 * @jws:timer timeout="1h"
 */
TimerFactory manyTimers;
```

Figure 14a

```
Timer t = manyTimers.create();

// then you can just use the control, store it, or whatever.
t.start();

// For example, let's associate a name with the timer...
timerMap.put(t, "First Timer");
```

Figure 14b

```
void manyTimers_onTimeout(Timer t, long elapsed)
{
    // let's retrieve the remembered name associated with the timer
    String timerName = (String)timerMap.get(t);

// and print it out
    System.out.println("Event received from " + timerName);
}
```

Figure 14c

SYSTEMS AND METHODS FOR AN EXTENSIBLE SOFTWARE PROXY

CLAIM OF PRIORITY

This application is a divisional of U.S. patent application Ser. No. 11/734,239, filed Apr. 11, 2007, by Kyle W. Marvin, et al., entitled SYSTEMS AND METHODS FOR AN EXTENSIBLE SOFTWARE PROXY (herein incorporated by reference in its entirety), which is a divisional of U.S. patent application Ser. No. 10/233,118, filed Aug. 30, 2002, by Kyle W. Marvin et al., entitled METHODS AND APPARATUS FOR BUILDING, CUSTOMIZING AND USING SOFTWARE ABSTRACTIONS OF EXTERNAL ENTITIES, now U.S. Pat. No. 7,516,447 (herein incorporated by reference in its entirety), which claims benefit from U.S. Provisional Patent Application No. 60/359,409, filed Feb. 22, 2002, by Kyle W. Marvin, et al., entitled UNIFIED FRAMEWORK FOR INTERACTING WITH EXTERNAL ENTITIES FROM A PROGRAMMING LANGUAGE AND EXAMPLE APPLICATIONS (herein incorporated by reference in its entirety).

CROSS-REFERENCE TO RELATED APPLICATIONS

This application is related to the following applications which are hereby incorporated by reference in its entirety:

U.S. patent application Ser. No. 10/780,346, filed Feb. 17, 2004, by Kyle W. Marvin, et al., entitled SYSTEMS AND METHODS FOR AN EXTENSIBLE SOFTWARE PROXY, now abandoned.

U.S. patent application Ser. No. 10/784,492, filed Feb. 23, 2004, by Kyle W. Marvin, et al., entitled SYSTEMS AND METHODS FOR CREATING NETWORK-BASED SOFTWARE SERVICES USING SOURCE CODE ANNOTATIONS, now U.S. Pat. No. 7,707,564.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to the field of data processing. More specifically, the present invention is related to software interaction methods.

BACKGROUND OF THE INVENTION

In the course of developing modern software applications, developers are often confronted with the problem of interacting with external entities that don't look, feel or behave like familiar internal programming language objects. These external entities include databases, legacy systems, web services, non-native software components, as well as physical objects (e.g. to control their settings).

Generally, the programmer must learn new paradigms, skills and techniques for interacting with each of these entities. In addition, the programmer must develop or acquire a potentially large body of software to deal with the intricacies of each type of external entity. For example, writing software that interacts with an external web service may require the developer to master several new technologies, including the eXtensible Markup Language (XML), the XML Schema Language, the XML Protocol (XP a.k.a SOAP) and the Web Service Description Language (WSDL).

Each type of external entity with which the application interacts requires a different set of skills, knowledge and software from the developer. E.g., interacting with a database requires a completely difference set of skills, knowledge and software than interacting with an external web services. The additional burden associated with learning and implementing technologies for interacting with a variety of external entities increases the time, knowledge, skills and ultimately money required to develop a software application.

What is needed is a simple software abstraction that provides uniform access to external entities, reuses the developer's existing knowledge of general software concepts, and minimizes the specialized knowledge required for interacting with each type of external entity. Not only should these software abstractions be easy to use, but they should also be easy to customize for a particular purpose, with little or no software development. The software abstraction should make it easy to interact with several instances of an external entity simultaneously (e.g., use several instances of a web service to perform credit checks for several customers simultaneously). It should also simplify the handling of asynchronous events (e.g., a database trigger) generated by one or more instances of an external entity.

Consider for example the computing environment of FIG. 1. Example computing environment 100, as illustrated, includes servers 102, 115, 120 and 125, and client 112 communicatively coupled, through networking fabric 101.

Server 125 offers as an example ecommerce application 130, with which users of various client devices, such as client 112, may shop and purchase various items. Ecommerce application 130 may include a number of web pages 131 having contents, such as merchandise descriptions, reviews and pricing information, and one or more functions 132.

Complementarily, server 102 offers, as an example, shopping cart service 104 used by ecommerce applications, such as ecommerce application 130 (e.g., when users of client devices interact with their web pages/functions 131/132). As a result, developers of ecommerce applications need not develop their own "shopping cart" functions, and may concentrate their effort on the contents of web pages 131 instead.

Shopping cart service 104 may include e.g. an "add an item to cart" function, a "remove an item from cart" function, and a "checkout" function. In response to a user's selection of e.g. a graphical button displayed on a web page 131, one of functions 132 may cause one or more requests for the appropriate shopping cart functions to be generated and sent to shopping cart service 104 for processing on server 102.

Processing of these requests may in turn require the shopping cart functions to interact for example with services 118 and 128 of servers 115 and 120. Examples of services 118 and 128 are credit authorization, inventory or production slots confirmation, shipment/delivery scheduling, and so forth.

Thus, even in this limited example, developers of ecommerce applications 130 have to equip applications 130 to interact with an external "shopping cart" service 104, while developers of "shopping cart" service 104 have to equip service 104 to interact with external entities such as credit authorization, inventory/production slot confirmation, shipment/delivery scheduling, and so forth.

In addition to the general purpose web service software (e.g., XML, SOAP, WSDL) normally required to facilitate these interactions, each type of web service (e.g., shopping card, credit authorization, shipping) requires specialized software be written to interact with its specific features. For example, software must be written to create the "add item to cart" XML message and send it to the URL address associated with the correct shopping basket. In addition, software must be written to map messages returned by the credit check and shipping services into a form that may be presented to the end user.

As those skilled in the art would appreciate, typically, the example would require simultaneous and asynchronous interaction with several instances of each external service. E.g., at any instance in time, an ecommerce application 130 may be hosting many users, each having a separate shopping cart, containing different items. Shopping cart service 104 in turn may be processing shopping cart interactions for a multitude of carts of different users of different ecommerce applications. In like manner, a credit authorization service may be processing authorization requests for a multitude of checkouts occurring for a number of ecommerce applications at the same time. Notification of final credit approval and shipping arrangements for each of these transactions may occur asynchronously (e.g., via e-mail) after the customer has completed their order(s). Clearly, it is critical that the shopping carts, credit authorizations, shipping details and notifications associated with each customer are correlated and kept separate from that of other customers, even when several customer requests are processed simultaneously. The software required to handle the required correlation and asynchronous event handling can become quite complex.

Even in this relatively simple example, it is clear application developers must generally acquire new and specialized skills, knowledge and software to interact with external entities. They must often create specialized software for interacting with specific forms of each external entity. They must also deal with the complexities of interacting simultaneously and asynchronously with several instances of a given type of entity. Accordingly, a simple software abstraction that provides uniform access to external entities, simplifies creating specialized software abstractions for specific types of external entities, and facilitates interacting simultaneously and asynchronously with multiple instances of an external entity is desired.

BRIEF DESCRIPTION OF THE DRAWINGS

The present invention will be described by way of exemplary embodiments, but not limitations, illustrated in the accompanying drawings in which like references denote similar elements, and in which:

FIG. 5 illustrates an example specification of a proxy object definition for an example external timer;

FIG. 7 illustrates an example XML document specifying the syntax of meta-data properties available for customizing the behavior of a proxy object, in accordance with one embodiment;

FIGS. 9a-9c illustrate example specifications for declaring a proxy object, setting its properties and handling its asynchronous events;

FIG. 10a illustrates an example specification of a proxy object definition for an external entity that extends the proxy object definition of FIG. 5 by customizing the default values of its properties;

FIG. 10b illustrates an example specification of a proxy object definition that extends an existing proxy object definition by declaring a new function and associated default property settings;

FIGS. 14a-c illustrate specifications for declaring a proxy object factory, using a proxy object factory to create proxy objects and handling asynchronous events associated with generated proxy objects.

DETAILED DESCRIPTION OF THE INVENTION

The present invention includes a method and apparatus for simplifying the development, customization and use of proxy objects as software abstractions for interacting with external entities from within a software application.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

TERMINOLOGY

Parts of the description will be presented in data processing terms, such as data, selection, retrieval, generation, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical and/or optical components of a processor and its subsystems.

Part of the descriptions will employ various abbreviations, including but are not limited to:

| | |
|---|---|
| URL | Uniform Resource Locator |
| XML | eXtended Markup Language |

The term "external entity" as used in the application (including the claims) to refer to "external" hardware as well as software entities. "External" is viewed from the perspective of the software application interacting with the entity.

Section Headings, Order of Descriptions and Embodiments

Section headings are merely employed to improve readability, and they are not to be construed to restrict or narrow the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Overview

Figure 1:
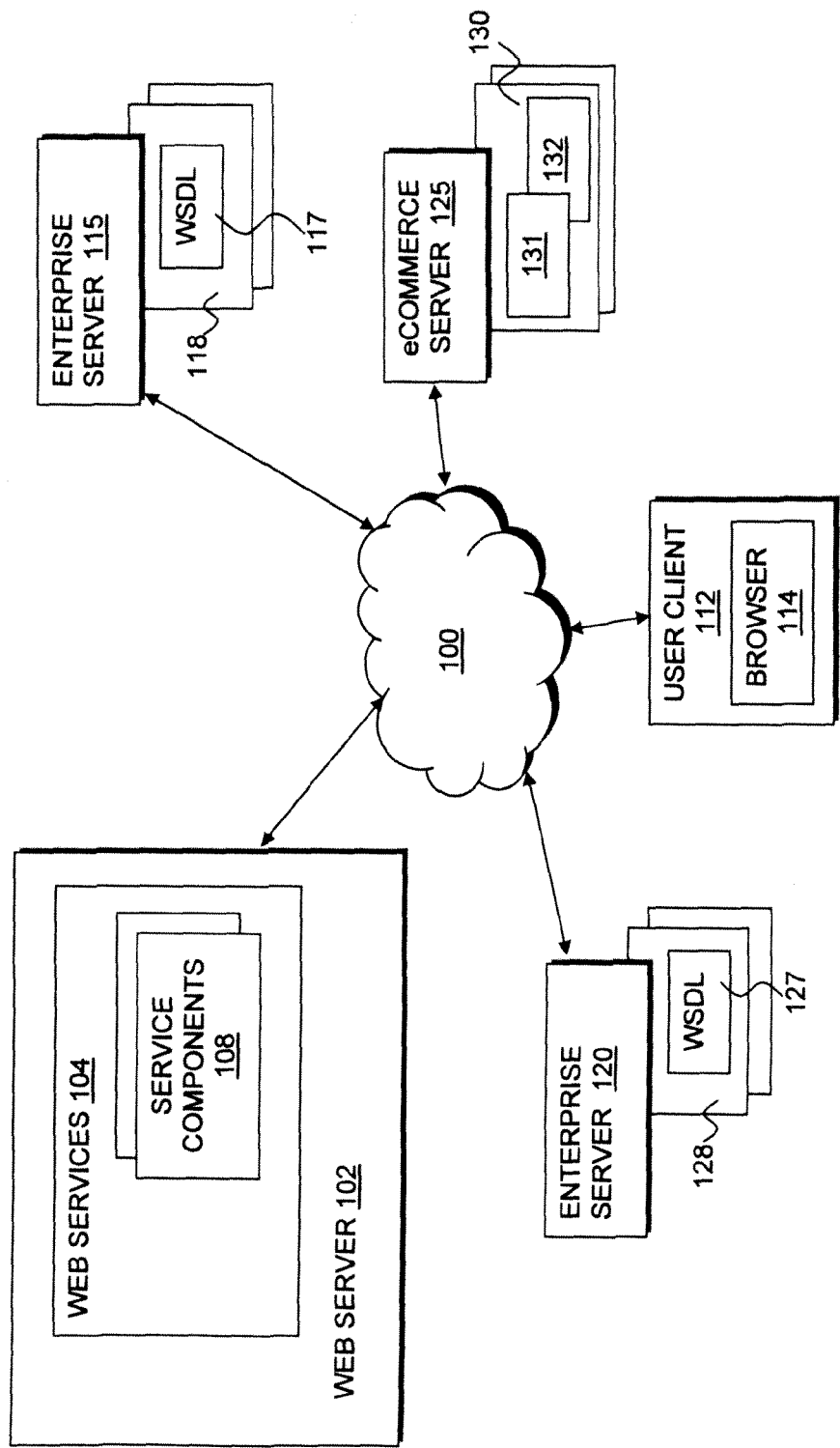
FIG. 1 illustrates an example computing environment of the prior art.
Figure 2:
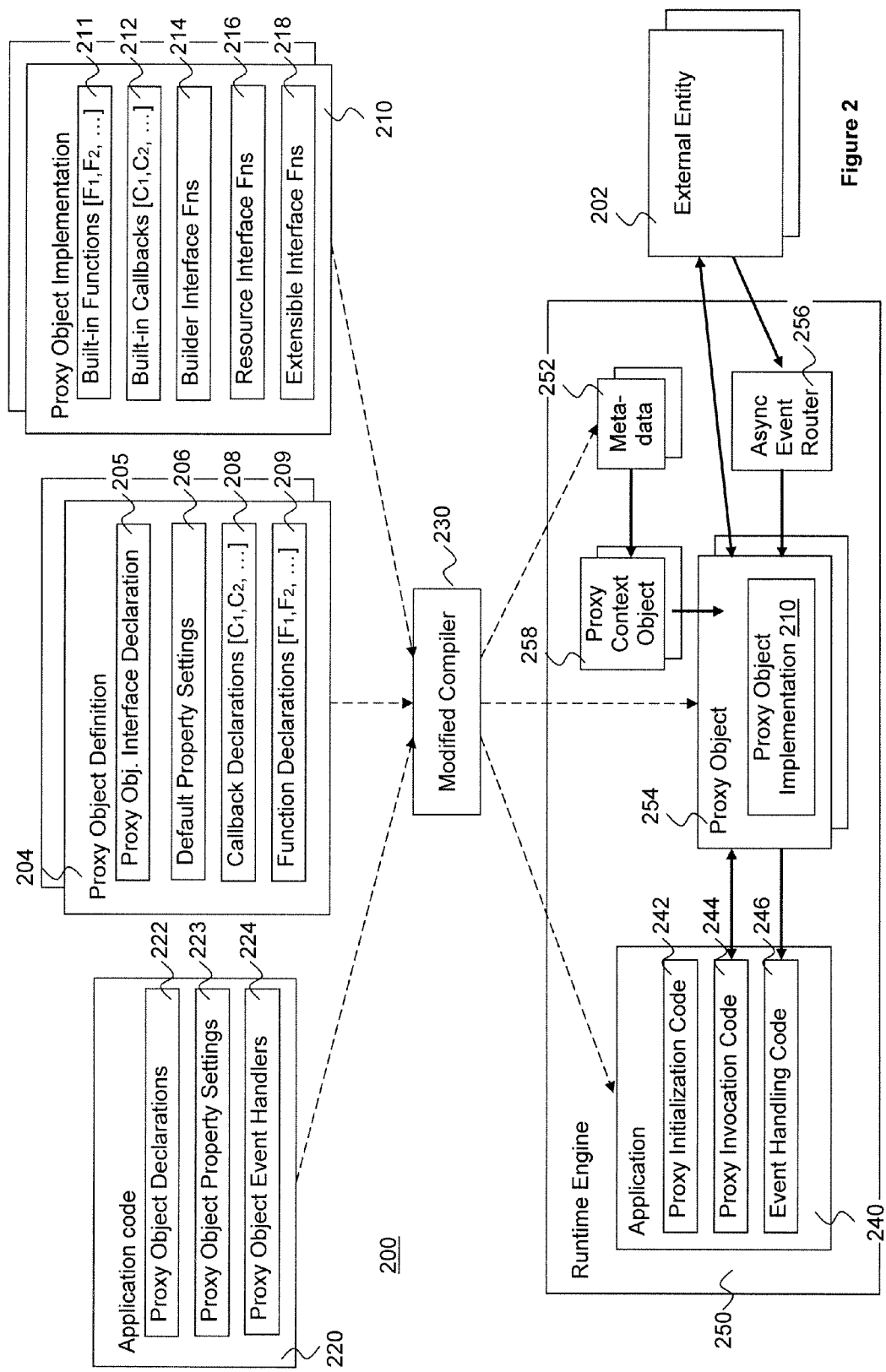
FIG. 2 illustrates an overview of the present invention, in accordance with one embodiment.

FIG. 2 illustrates an overview of the present invention, in accordance with one embodiment. As illustrated, to simplify developing software applications 240 that interact with external entities 202, the present invention provides methodologies and facilities to provide proxy objects 254 for external entities 202, such that software application 240 may interact with external entity 202 programmatically using general purpose programming concepts familiar to software developers.

More specifically, a developer may create a proxy object definition 204 for external entity 202. The developer may be the developer of external entity 202, a third party developer, or even the developer of application 240.

Proxy object definition 204 includes interface declaration 205 identifying that a proxy object 254 should be generated based on the definition for interacting with an external entity. Further proxy objection definition 204 includes default property settings 206 for defining the default behavior and default implementation 210 of proxy object 254, callback declarations 208 for handling asynchronous events from external entity 202 and function declarations 209 for initiating interactions with external entity 202.

In one embodiment, the one or more proxy object implementation classes 210 include a run-time implementation class. In another embodiment, the one or more implementation classes 210 further include a compile-time implementation class. In yet another embodiment, implementation classes 210 further include a design-time implementation class.

The run-time implementation class provides the run-time implementations for the functions declared in proxy object declaration 204 and used by software application code 220 to interact with external entity 202 programmatically. The run-time implementation class may provide one or more built-in functions 211 for initiating interaction with external entity 202 and one or more built-in callbacks 212 for handling asynchronous events generated by external entity 202.

The optional compile time implementation class provides the compile time validation implementation to assist compiler 230 in validating usage of the functions and property settings by proxy object definition 204 and by application code 220, during compilation.

The optional design-time implementation class provides the design-time implementation for assisting developers of proxy object definitions 204 and application code 220. It assists developers to extend and use properties and functions implemented by the run-time implementation for interacting with external entity 202 programmatically. An example of such design-time implementation includes but is not limited to a graphical wizard that guides the developer through the creation of a proxy object definition for a specific external web service given the WSDL description of that web service. Another example is the provision of graphic icons corresponding to usage of the functions of proxy object definition 204, which when selected for an application code 220, inserts the corresponding function call into the application code 220.

For the illustrated embodiment, the proxy object implementation 210 may implement one or more interfaces 214-218. In particular, for the embodiment, proxy object implementation 210 may implement builder interface 214, resource interface 216, and extensible interface 218.

Builder interface 214 may be implemented by the compile-time component of proxy object implementation 210 to assist compiler 230 in validating the usage of properties and functions implemented by proxy object implementation 210. Resource interface 216 may be implemented by the run-time component of proxy object implementation 210 to acquire and release critical resources, such as databases and file handles, needed by the proxy object implementation. Extensible interface 214 may be implemented by the run-time component of proxy object implementation 210 to enable proxy object definitions 204 to declare new functions not built-in to proxy object implementation 210.

Still referring to FIG. 2, once proxy object definition 204 and implementation 210 are created, a developer of application code 220 may equip application 240 to initiate interactions with external entity 202 by including proxy object declarations 222 and invoking declared functions 209 on the resulting proxy objects. Application code may also include property settings 223 to customize the behavior of proxy objects or include event handlers 224 to process asynchronous events generated by external entity 202.

Software application code 220, proxy object definitions 204, and proxy object implementations 210 equipped in accordance with the present invention are compiled into application 240, proxy objects 254, and meta-data 252 using enhanced compiler 230.

Compiler 230 is enhanced to recognize proxy object definitions 204 and generate associated proxy objects 254 using proxy object implementations 210 to facilitate interaction with software entity 202 at runtime. Compiler also generates proxy initialization code 242 that creates a proxy object for each proxy object declaration 222, assigns the proxy object to the declared variable, and registers the proxy object with asynchronous event router 256 to receive appropriate events generated by the associated external entity 202. Further, compiler 230 is enhanced to gather and output meta-data 252 describing the interfaces, functions, callbacks and property settings of property object definitions 204 for use by the corresponding proxy object 254 at runtime.

Still referring to FIG. 2, execution of compiled object code during runtime is under the control of runtime engine 250. Runtime engine 250 includes in particular, proxy context objects 258, an instance of which is created for each proxy object invocation for interacting with an instance of external entity 202 and maintaining the state information of the particular interaction. For the embodiment, interaction context 258 includes a number of methods through which proxy object implementation 210 may obtain information about a particular interaction.

For the embodiment, as described earlier, proxy object definition 204 may declare one or more callback functions 208 for handling asynchronous events generated by corresponding external entity 202. Complementarily, runtime engine 250 includes asynchronous event router 256 for listening for, receiving, and routing asynchronous events generated by external entity 202 to appropriate proxy objects 254 for processing by event handling code 246 of application 240. The locations listened to by asynchronous event router 256 are specified by proxy initialization code 242 based on proxy object implementation 210 and associated property settings 204 and 223.

Using the mechanisms described above, developers may create application code 220 to interact with external entities 202 by invoking functions on declared proxy objects 222, setting proxy object properties 223 and defining event handlers 224. Interacting with external entities in this way is very similar to interacting with other software objects and does not require the developer to learn excessive new paradigms, skills and/or techniques. In addition, developers may create new proxy object definitions 204, even with new functions and callbacks without specifying the implementation of the new functions or callbacks. The resulting proxy objects 254 in cooperation with run-time engine 250 handle multiple simultaneous and asynchronous interactions with external entity 202.

In various embodiments, the external entity 202 may be a web service, a database, or a legacy system, as well as physical objects.

Provision of the optional design time implementation class is not an essential aspect to practice the present invention. Moreover, it is within the ability of those ordinarily skilled in the art, thus will not be further described. Other aspects of the present invention will be further described in turn below.

Proxy Object Definition

Figure 3:
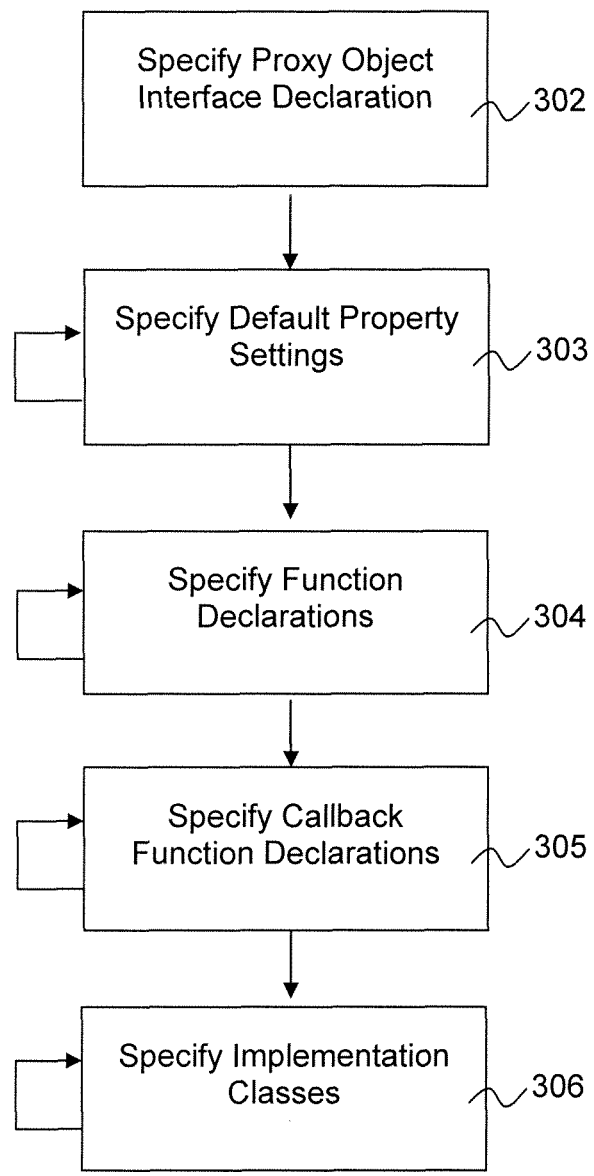
FIG. 3 illustrates the method of specifying a proxy object for an external entity, in accordance with one embodiment.

FIG. 3 illustrates the operations a developer or design-time tool may take to develop a proxy object definition 204 of the present invention in further detail, in accordance with one embodiment. As illustrated, and alluded to earlier, one of the actions to be taken to create proxy object definition 204 is to specify a proxy object interface declaration 205, block 302.

Figure 4:
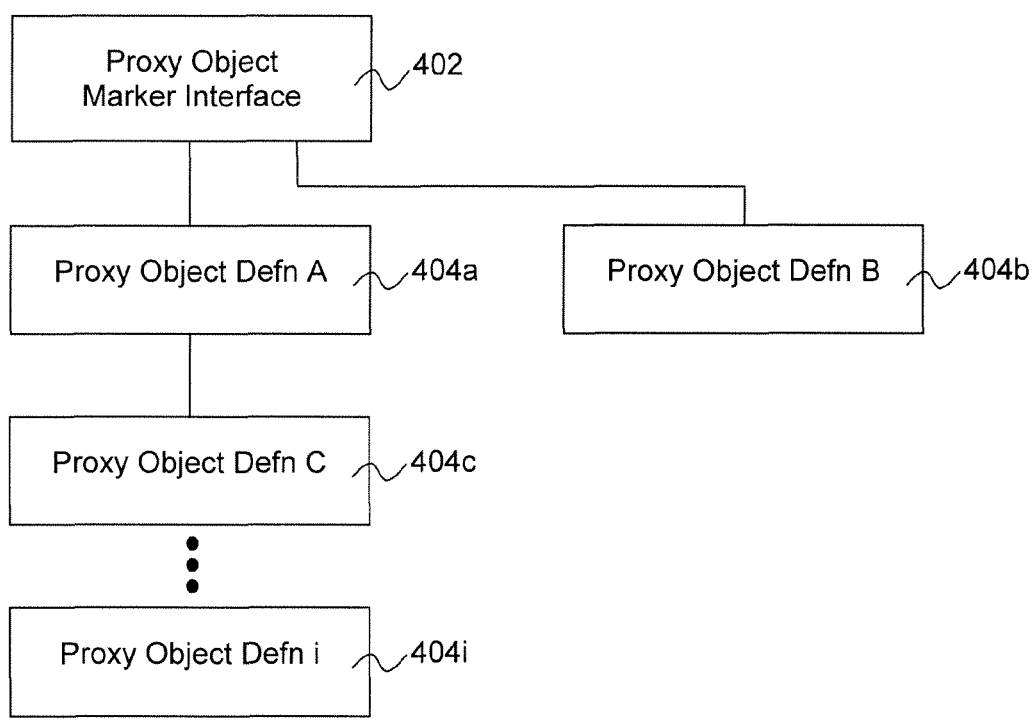
FIG. 4 illustrates the method of specifying that a software object is a proxy object for an external entity by direct or indirect association with a marker proxy-object interface, in accordance with one embodiment.

In one embodiment, this is achieved by declaring that proxy object definition 204 extends a special "proxy object" marker interface (402 of FIG. 4). As illustrated in FIG. 4, the extension of the marker interface 402 may be direct, as in the cases of proxy object definitions 404a-404b or indirect, as in the cases of proxy object definitions 404c-404i. At compile-time, enhanced compiler 230 will identify proxy object definitions 204 by finding interfaces that extend marker interface 402 and will generate proxy objects for each such interface. If the extension of the marker interface 402 is indirect, proxy object definition 204 will inherit the functions, properties and callbacks of the other proxy object definitions it extends (e.g., proxy object definition 404i will inherit the functions, properties and callbacks defined by proxy objects 404c and 404a).

Referring back to FIG. 3, as illustrated, and alluded to earlier, another action to be taken to create proxy object definition 204 is to specify the default property settings for the proxy object definition, block 303. These settings will be used at run-time by proxy object implementation 210 to determine the behavior of proxy object 254.

Further, the programmer or design-time tool may optionally specify function declarations 209 of proxy object definition 204, block 304. Application code 220 may use the declared functions to programmatically interact with external entity 202. Function declarations 209 may correspond to built-in functions 211 of proxy object implementation 210, or if proxy object implementation 210 implements extensible interface 214, function declarations 209 may introduce new functions not provided explicitly by proxy object implementation 210.

In addition, the programmer or design-time tool may optionally specify callback function declarations 208 representing asynchronous events that may be generated at runtime by external entity 202. Callback function declarations 208 may correspond to built-in callback functions 212 of proxy object implementation 210, in which case proxy object 254 will route corresponding asynchronous events generated by external entity 202 to proxy object implementation 210 for processing (which may, in turn, route them to event handling code 246 of application 240). When callback function declarations 208 do not correspond to built-in callback functions 212 of proxy object implementation 210, proxy object 254 will route corresponding asynchronous events generated by external entity 202 directly to event handling code 246 of application 240.

Further, the developer or design-time tool may specify the implementation classes of the proxy object definition 204, which includes the runtime implementation class, and optionally, the compile time implementation class and/or the design time implementation class, block 306. Proxy object definition 204 need not specify implementation classes if it extends another proxy object definition that specifies implementation classes. In this case, the implementation class specifications are inherited from the extended proxy object definition.

In one embodiment, specifications of the implementation classes are made using property settings. In one embodiment, property settings are specified in an annotation form, i.e. in what is conventionally considered to be comments of a source file.

FIG. 5 illustrates an example proxy object definition of an external timer entity. Those skilled in the art will recognize this as a familiar Java interface definition extending an existing interface called com.bea.jws.ProxyObject on line 502 and including some special JavaDoc comments on lines 510-516. The Timer interface is identified as a proxy object definition of the present invention through declaration 502 specifying the Timer interface extends the "ProxyObject" marker interface of the present invention. In this case, the Timer interface extends the ProxyObject marker interface directly; however, it is also possible to extend the ProxyObject marker interface indirectly as depicted in FIG. 4.

Further, the Timer interface is specified as having a setTimeoutIn (int milliseconds) function 504a, a setTimeoutAt(java.util.Date date) function 504b, and so forth for application code 220 to set an "alarm" after n elapsed units of time or at a specific moment in time.

In addition, the Timer interface includes a callback function 504c for handling alarm events generated by external entity 202 e.g., by passing them to application 240 asynchronously, when the timer expires at the requested time. In one embodiment, callback declarations are functions defined in a nested interface named "Callback" as depicted in FIG. 5.

The runtime, compile time and design time implementation classes are specified as "com.bea.jws.private.TimerImpl" 512, "com.bea.jws.private.TimerValidator" 514, and "com.beajws.private.TimerDesigner" 516 respectively. The specifications are made using property settings. In one embodiment, property settings are specified in an annotation form in a comment section. As those skilled in the art will recognize, property settings in this example are specified using the special Javadoc annotation @implementation 510.

Proxy Object Implementation

Except for the exploitation of extensible, resource and/or builder interfaces 214-218, usage of proxy context object 258, and implementation of facilities in conformance to the expected execution paradigm, the core constitution of each implementation class, whether it is runtime, compile time, or design time, is application dependent. That is, they vary depending on the behavior of and services offered by external entity 202, and the nature of the functions.

However, as alluded earlier, the runtime implementation class is expected to implement the functions of the proxy object definition 204 in the execution context of the present invention either directly through built-in functions 211 or indirectly through the "invoke" function of extensible interface 218.

Figure 6:
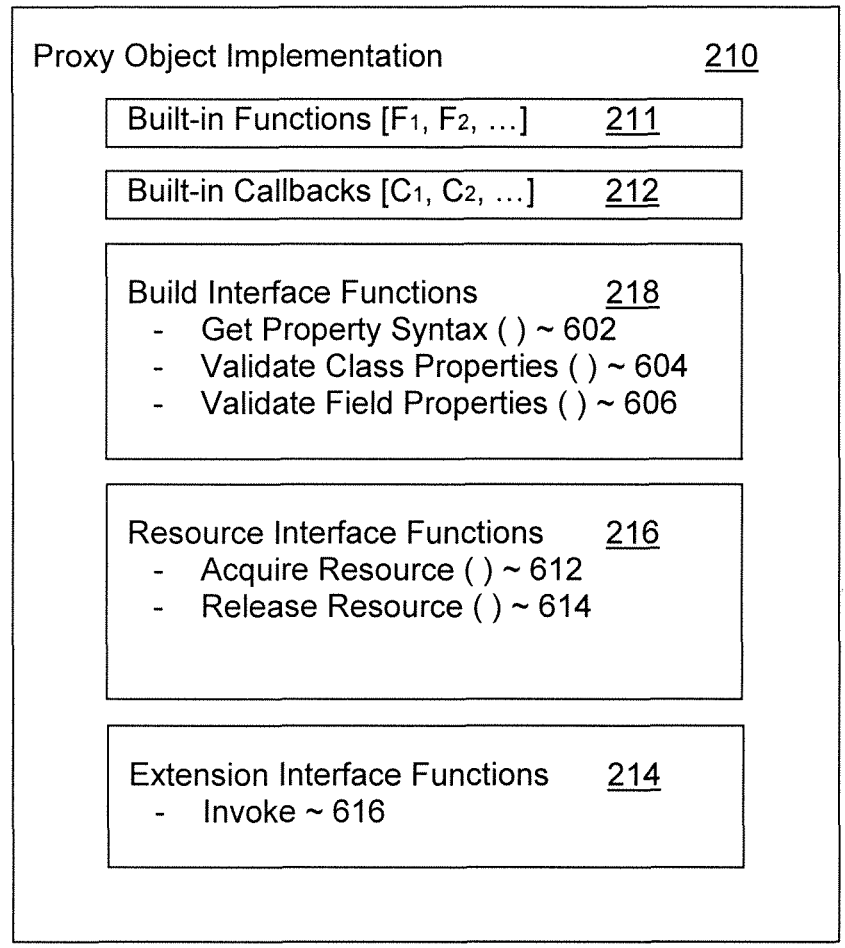
FIG. 6 illustrates the proxy object implementation of FIG. 2 in further detail, in accordance with one embodiment.

FIG. 6 illustrates proxy object implementation 210 in further detail, in accordance with one embodiment. As illustrated, for the embodiment, proxy object implementation 210 includes built-in functions 211, built-in callback functions 212, builder interface 214, resource interface 216 and extension interface 218.

As described earlier, builder interface 214, when implemented by a compile time implementation class, assists compiler 230 to validate the properties defined by the proxy object definition 204 and used by application code 220 are supported by proxy object implementation 210. In addition, builder interface may be used by an integrated development environment to help the developer understand where and how properties may be used.

Resource interface 216, when implemented by a runtime implementation class, assists the runtime implementation class in acquiring and releasing resources, such as database connections and file handles.

Extensible interface 218, when implemented by a runtime implementation class, enables proxy object definitions 204 to declare new functions, not directly supported by proxy object implementation 210, without defining how those functions are implemented.

For the illustrated embodiment, builder interface 218 includes in particular a Get Property Syntax function 602, Validate Class Properties function 604, and Validate Field Properties function 606. As the names of these functions suggest, when invoked, these functions return a description of the valid property syntaxes for the proxy object and validate the class and field level properties of the proxy object.

In one embodiment, when invoked, Get Property Syntax function 602 returns a URL identifying a file provided by the developer of the compile time implementation class, describing the valid property syntax in the form of a XML file.

An example snippet of such a XML file is illustrated in FIG. 7. As illustrated, such snippet may specify the name of a property, 702a or 702b, the attributes of a property, 704a, 704b, or 704c, including whether they are required, the data type of the attribute values 706, and if applicable, their default values 708.

For the example snippet, it specifies that the "@sql" property is only allowed in front of proxy object definition functions 208, and the presence of the property is required here. The @sql property may have statement, maxcount, and returnType attributes. The statement attribute is required. Unless specified otherwise, all attributes must be assigned values. Maxcount and returnType are optional. Maxcount takes an integer value, and the default value is infinity. Unless specified otherwise, attributes (such as Statement and returnType) take string values, and the default value is the empty string. The @pool annotation is allowed in front of proxy object declarations 222, proxy object definition functions 209, and proxy object definitions 204, and is optional in all these locations. Finally, the @pool annotation can have a name attribute, which should be present and have a string value.

In alternate embodiments, the information may be provided and/or returned in other formats or using other data organization techniques.

Implementations of Get Property Syntax function 602, Validate Class Properties function 604, and Validate Filed Properties function 606 are within the ability of those skilled in the art, accordingly will not be further described.

Implementing the builder interface 218 enables a compile time implementation class to use these functions to provide the expected syntax, and to validate the meta data, for compiler 230.

Referring back to FIG. 6, for the illustrated embodiment, resource interface 216 includes an Acquire Resource function 612 and Release Resource function 614. As the names of these functions suggest, function 612 enables proxy object implementation 210 to acquire system resources, such as database connections and files handles, needed by the implementation before the run-time creates each new instance of a proxy and function 614 enables proxy object implementation 210 to release resources after the run-time destroys each instance of a proxy object. Similarly, implementations of Acquire Resource function 612 and Release Resource function 614 are within the ability of those skilled in the art, accordingly will not be further described.

Still referring to FIG. 6, for the illustrated embodiment, extension interface 214 includes an Invoke Object function 616. Invoke object function 616 is designed to handle invocation of custom methods declared by proxy object definitions 204. Thus, proxy object definitions 204 may declare new functions 209 not specifically implemented by built-in functions 211 of proxy object implementation 210. During runtime, when application code 220 invokes new functions 209, proxy object 254 will dispatch them to invoke function 616 of proxy object implementation 210. Invoke function 616 of proxy object implementation 210 may access the name, arguments, return type, properties and other meta-data related to proxy object invocation 244 via proxy context object 258 to determine the desired semantics of the invoke operation. The access may be made using e.g. methods associated with proxy context object 258.

Similarly, implementation of Invoke Object function 616 is within the ability of those skilled in the art, accordingly will not be further described.

Developing Application

Figure 8:
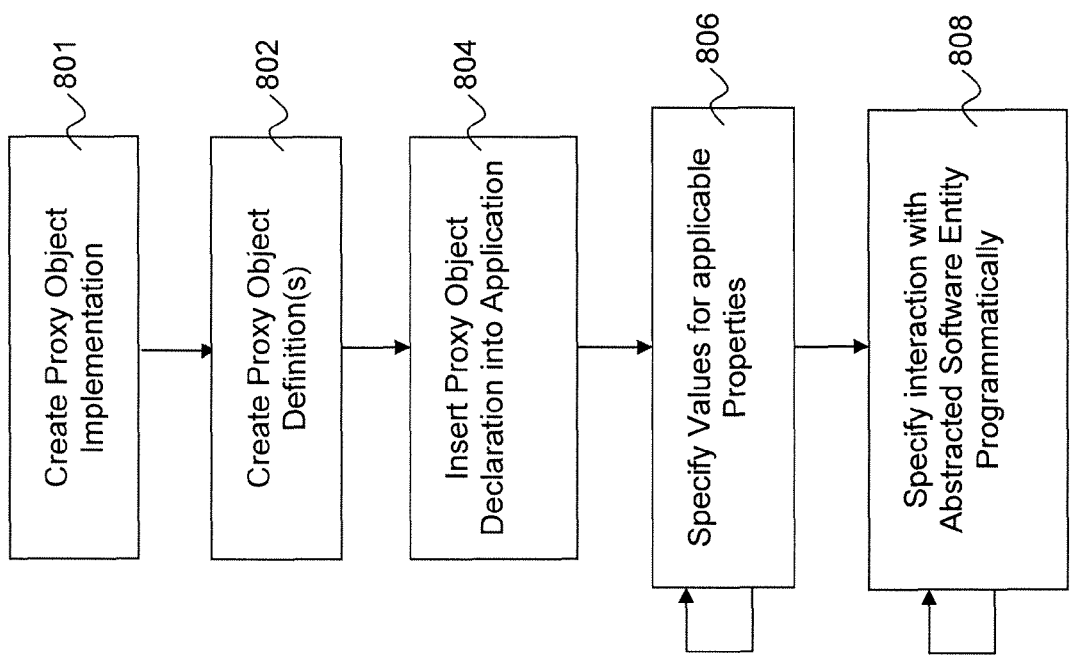
FIG. 8 illustrates the application development method of the present invention, including usage of software abstractions for external entities, in accordance with one embodiment.

FIG. 8 illustrates the application development method of the present invention, including usage of software abstractions for external entities, in accordance with one embodiment. As illustrated, at block 801, a proxy object implementation 210 is first created optionally including built-in functions, built-in callbacks, builder interface implementation, resource interface implementation and/or extensible interface implementation.

Then, at block 802, a proxy object definition 204 is created, extending the marker ProxyObject interface directly or indirectly through another proxy object definition. If proxy object definition extends ProxyObject marker interface directly it specifies the associated proxy object implementation 210 e.g. using an "implementation" property. A proxy object definition that extends the ProxyObject marker interface indirectly may also specify an associated implementation overriding the implementation associated with its base class. The proxy object definition may also specify new default property values and if implementation 210 is extensible specify new functions and callbacks. The proxy object definition may be made by the developer of application 220, developer of proxy object implementation 210 or another independent third party. As described earlier, a proxy object definition 204 is extensible if the associated implementation 210 implements extension interface 214. Example extensions will be described below referencing FIGS. 10a-10b.

At block 804, a developer of application 220 inserts one or more proxy object declarations 222 into application code 220 referencing proxy object definition 204. As alluded to earlier, the proxy object definition 204 may be the base proxy object definition 204 e.g. offered by the developer of the software abstraction of external entity 202 or it may be a customized version of the proxy object definition 204. An example declaration will be described below referencing FIG. 9a.

At block 806, a developer of application 220 specifies values for applicable ones of the properties of the proxy object definition 204. In one embodiment, the specification is in annotation form within a comment section of the source file. An example specification will be described below referencing FIG. 9b.

Having inserted proxy object declarations 222, and for applicable ones, if any, the property values, at block 808, an application 220 may interact with external entity 202 programmatically, using the functions defined by proxy object definitions 204 and implemented by implementation 210 either directly using built-in functions 211 or indirectly by the extensible interface 218.

As alluded to earlier, a developer of application 220 may also specify a handler for asynchronous events generated and sent by an asynchronous event generation function of the software abstraction of external entity 202. An example specification will be described below referencing FIG. 9c.

Customizing Proxy Object Properties

FIG. 10a illustrates a simple proxy object definition 204 that extends the example Timer interface shown in FIG. 5 by specifying a new interface declaration 1002 and a new default property setting 1004. The StandardTimer proxy object definition of FIG. 10a inherits all the functions and properties defined by the proxy object definition in FIG. 5, but changes the default setting for the "timeoutIn" attribute of the @Timer property to 30 seconds. Consequently, applications 220 that use the StandardTimer will not need to specify the timeoutIn attribute or the @Timer property if 30 seconds is acceptable.

Those skilled in the art of course will recognize that the above example is purposely kept simply to facilitate illustration and ease of understanding. In practice, a proxy object definition of the present invention may customize default property settings much more extensively. In particular, a proxy object definition may also customize properties associated with property object functions and callbacks. In addition, property object definitions may be customized multiple times successively, that is a customized property object definition may itself be further customized.

Customizing Proxy Object Interfaces

When a proxy object implementation 210 implements extensible interface 214, it is also possible to customize the interface of associated proxy object definitions 204 by adding new function declarations 209 and callback declarations 208. FIG. 10b illustrates an example proxy object definition 1020 named EmployeeDB that customizes the com.bea.jws.Database proxy object definition by declaring a new function named getEmployeeData. The interface declaration 205 on line 1022 declares that the EmployeeDB interface extends the com.bea.jws.Database interface, which in turn extends the com.bea.jws.ProxyObject interface (not shown) identifying the EmployeeDB interface as proxy object definition of the present invention. As such, the EmployeeData interface will inherit all the property settings, functions and callbacks declared in the Database proxy object definition and all proxy object definitions it extends.

Line 1028 is a function declaration adding the function getEmployeeData to the existing list of functions inherited from the Database proxy object definition. This function may be invoked by application 240 at run-time to interact with the external employee database described by proxy object definition 1020. Note, however, that none of the proxy object definitions or proxy object implementation specifically implements the getEmployeeData function. The details of exactly how invocations to functions 209 declared by proxy object declarations 204 are handled at run-time is further specified below.

Line 1026 is a property setting describing the desired semantics of the getEmployeeData function and line 1024 defines the EmployeeRecord data structure returned by the getEmployeeData function. All interface declarations 205, property settings 206, callback declarations 208, function declarations 209 and associated definitions (e.g., the EmployeeRecord data structure) are stored by compiler 230 in meta-data 252 and available to proxy object 254 at run-time via proxy context object 258. This meta-data assists proxy object 254 and proxy object implementation 210 to provide implementations of functions 208 and callbacks 209 declared by proxy object definitions 204.

Using Proxy Objects

FIG. 9a illustrates an example proxy object declaration 222 as it might be found in application code 220. Line 902 declares a new proxy object named theTimer that implements the com.bea.jws.Timer proxy object definition from FIG. 5.

FIG. 9b illustrates an almost identical example proxy object declaration with the timeoutIn attribute of the @Timer property set to the value 30 sec, 904. In this example, the value of the timeoutIn property is specified as a Javadoc annotation in a comment section. Application code 220 may invoke functions on this object to interact with the associated external timer entity. In addition, the developer of application code 220 may specify handlers for asynchronous events generated by external entity 202.

FIG. 9c illustrates one such example asynchronous event handler for handling asynchronous timeout event notifications 906. In this example, the handler is written as a specially named function in application code 220. The function name is formed by appending the name of the asynchronous event to be handled (i.e., "on Timeout") to the name of the associated proxy object (i.e., "theTimer"). As we will see below, at run-time, proxy object 254 will forward asynchronous events to the appropriate event handling code 246 in application 240.

Compile-Time

Figure 11A:
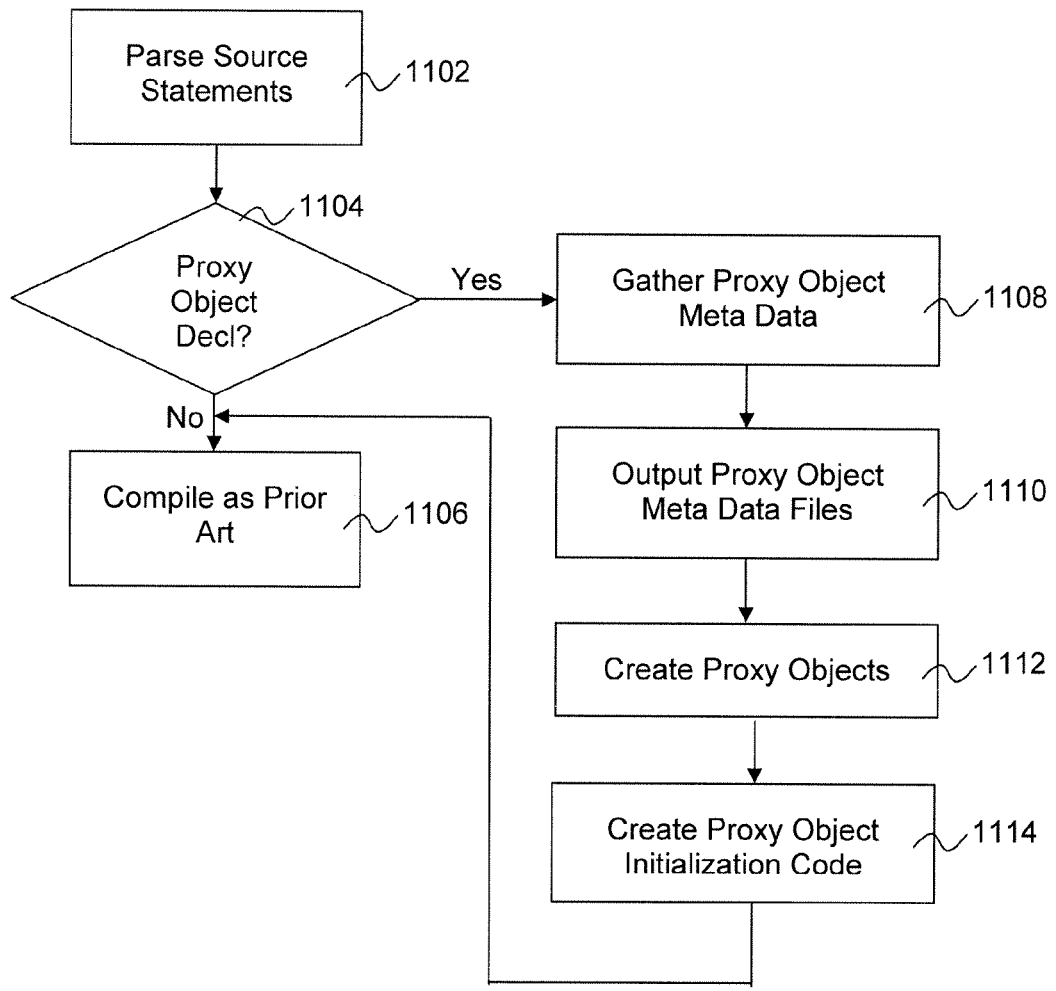
FIGS. 11a-11b illustrate the operational flow of the relevant aspects of the enhanced compiler of FIG. 2, in accordance with one embodiment.
Figure 11B:
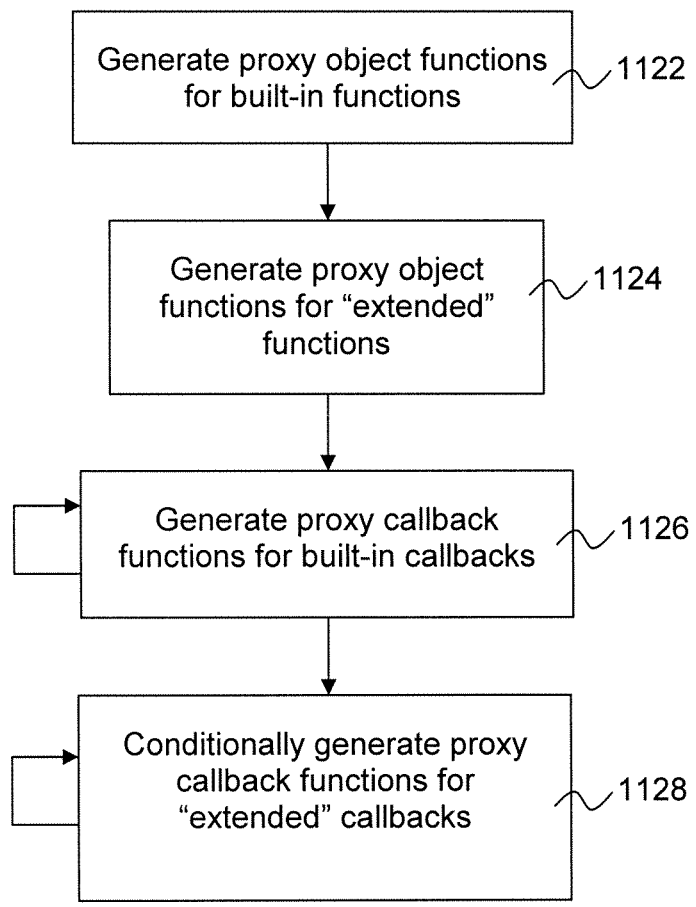

FIGS. 11a-11b illustrate the operational flow of the relevant aspects of compiler 230, in accordance with one embodiment. As illustrated first by FIG. 11a, at block 1102, compiler 230 parses the source statements of application code 220 to determine the language elements present in the source statements. In particular, compiler 230 determines if any proxy object declarations of the present invention are included in application code 220 by looking for objects declared to implement interfaces derived from proxy object marker interface 402, block 1104.

If no proxy object declarations of the present invention are found, application code 220 is compiled as other software entities in the prior art, block 1106. The exact nature of this compilation is language and compiler implementation dependent.

If at least one proxy object declaration of the present invention is found, compiler 230 gathers the meta data necessary to describe each proxy object of the present invention, block 1108.

In one embodiment, the meta data gathering operation includes identifying and extracting property settings 223 from application code 220 and default property settings 206 from all associated proxy object definitions 204, including proxy object definitions from which the proxy object definitions identified in proxy object declarations 222 are derived. In addition, meta data gathering includes identifying and extracting the names and signatures of declared interfaces 205, declared functions 209 and declared callbacks 208 from all associated proxy object definitions 204 as well as the names and signatures of built-in functions 211 and built-in callbacks 212 of proxy object implementation 210.

In one embodiment, property settings are specified using a Javadoc annotation form in the comment sections of the source file of application code 220 and proxy object definitions 204. Compiler 230 includes a property processor (not shown) responsible for parsing the comment sections of the source file of application code 220 and proxy object definitions 204.

In one embodiment, consultation with the compile time implementation class is also performed by the property processor of compiler 230 to verify the property settings and associated properties are implemented and allowed by proxy object implementation 210. In one embodiment, the consultation is made through the functions of builder interface 218.

Upon gathering up the meta data necessary to describe each proxy object of the present invention, compiler 230 outputs one or more meta data files 252 containing the gathered meta data, block 1110, for use by the corresponding proxy object 254 during runtime.

Then, compiler 230 generates a proxy object 254 for each proxy object definitions 204 associated with (e.g., referenced by) proxy object declarations 222 to facilitate the interaction between the application 240 and the external entity 202. This process is described in more detail below referencing FIG. 11*b*.

Further, compiler 230 generates proxy initialization code 242 for each proxy object declaration 222, block 1124. At run-time, each instance of proxy initialization code 242 creates a proxy object implementing the interface identified in the associated proxy object declaration 222, assigns the proxy object to the proxy object variable identified in the associated proxy object declaration 222 and registers the proxy object with asynchronous event router 256 to receive all asynchronous events from associated external entity 202.

Next, compiler 230 compiles the rest of the application code 220 as in the prior art inserting proxy initialization code 242 to run prior to associated proxy invocation code 244 and event handling code 246, block 1106. The manner the compilation is performed is language and compiler dependent.

Further, implementation of the property processor is within the ability of those skilled in the art, and will not be further described.

Figure 12:
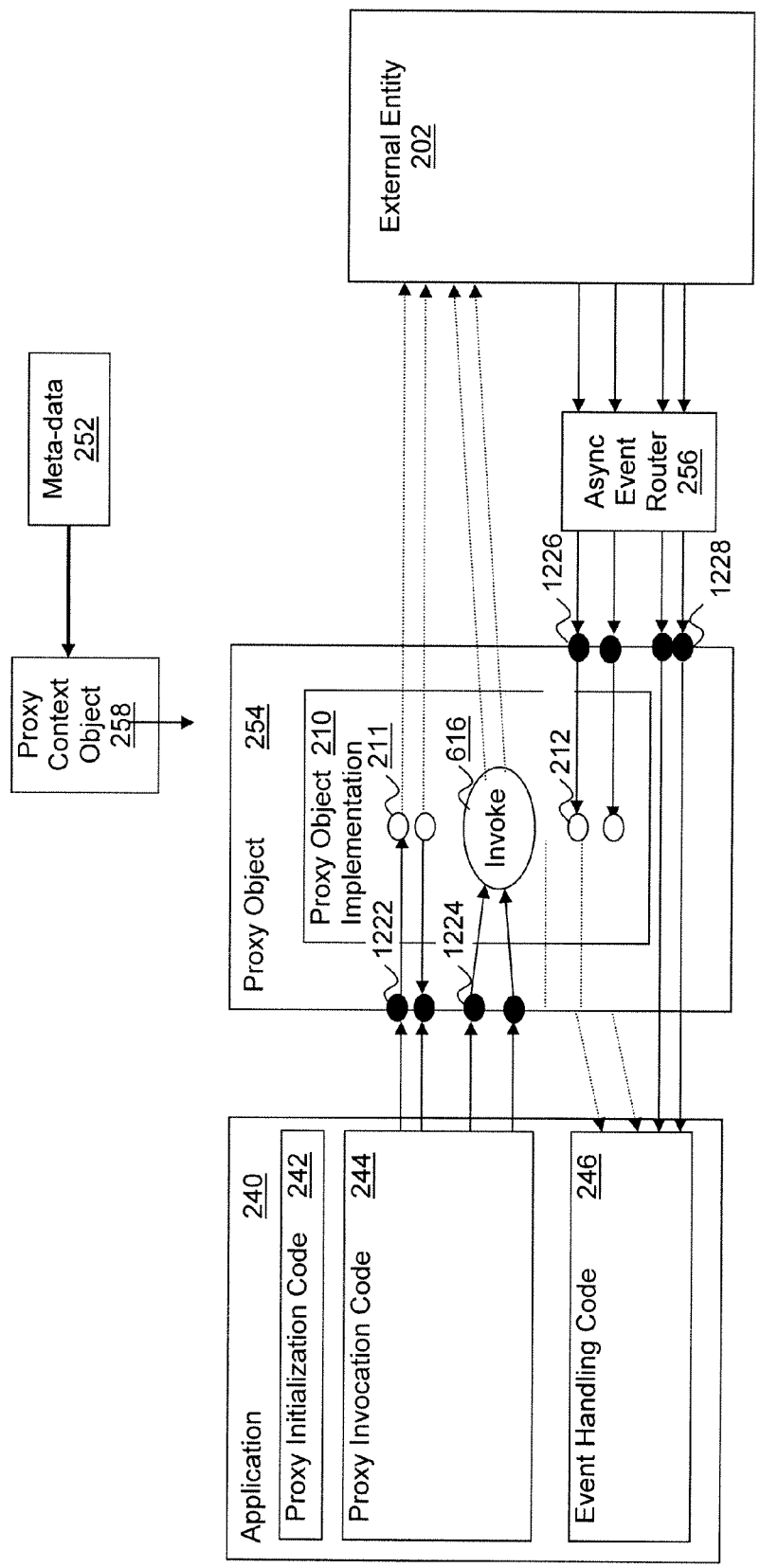
FIG. 12 illustrates the proxy object of FIG. 2 in further detail in accordance with one embodiment.

FIG. 12 illustrates proxy object 254 generated by compiler 230 in more detail. Proxy object 254 includes function interfaces 1222-1224 and callback interfaces 1226-1228 declared by proxy object definitions 204 and represented by black circles in FIG. 12. In addition, proxy object 254 includes proxy object implementation 210, including built-in functions 211 and built-in callbacks 212 represented by white circles in FIG. 12. If proxy object implements extensible interface 216, proxy object implementation also includes invoke function 616 for handling invocations to function interfaces 1224 that don't have a corresponding built-in function 211.

Further, Proxy object 254 and proxy object implementation 210 have access to meta-data 252 via proxy object context 258 describing associated proxy object definitions 204 (including interface declarations, property settings, callback declarations and function declarations) and property settings 223. This meta-data may be used at runtime to determine the desired semantics of invocations to function interfaces 1224 that don't have a corresponding built-in function 211. In one embodiment, a reference to proxy object context 258 may be obtained by calling the global function getProxyContext( ) provided by runtime engine 250. At run-time, the getProxyContext( ) function will return the proxy object instance associated with the current proxy object invocation as described further below.

As described earlier, in various embodiments, proxy object context 258 includes various methods for facilitating access of the "context" information. In one embodiment, these methods include a getMetaData( )method for getting meta data, and a getAttribute( )method for getting particular property values. Meta data may e.g. include methods, arguments, fields, and/or annotations associated with the proxy object functions and callbacks.

In one embodiment, proxy object context 258 also includes a getInstanceID( ) to facilitate obtaining the unique ID of the proxy object instance, and a sendEvent( ) for sending asynchronous events to application 240. In one embodiment, sendEvent( ) determines the appropriate event handler 246 to invoke by appending the name of the event to the name of the proxy object variable specified in proxy object declaration 222. It extracts the event name and proxy object variable name from meta-data 252. Implementation of these methods are within the ability of those skilled in the art, accordingly will not be further described. In alternate embodiments, the present invention may be practiced with more or less methods associated with proxy object context 258.

As described earlier, at block 1112, compiler 230 generates proxy object 254, more specifically, using information collected from application code 220, proxy object definitions 204 and proxy object implementation 210. As illustrated in FIG. 11*b*, it generates a proxy object function 1222 for each function declaration 209 in proxy object definitions 204 that have a corresponding built-in function 211 in proxy object implementation 210, block 1122. Each implementation of proxy object functions 1222 simply calls the corresponding built-in function 211 of proxy object implementation 210 passing in provide parameters and returns the result.

If proxy object implementation 210 implements extensible interface 214, compiler 230 also generates proxy object functions 1224 for each function declaration 209 in proxy object definitions 204 that do not have a corresponding built-in function 211 in proxy object implementation 210, block 1124. Each implementation of proxy object functions 1224 invokes "invoke" function 616 passing the list of provided parameters and returns the result.

Similarly, compiler 230 generates proxy object callback functions 1226 for each callback declaration 208 in proxy object definitions 204 that have a corresponding built-in callback 212 in proxy object implementation 210, block 1126. Each implementation of callback functions 1226 simply calls the corresponding built-in callback 212 passing provided parameters and returning any results.

Further, for each callback declaration 208 in proxy object definitions 204 that does not have a corresponding built-in callback 212 in proxy object implementation 210, compiler 230 determines whether an appropriate event handler 246 exists in application 240 to handle the call back, block 1128. If an appropriate event handler 246 exists, compiler 230 generates a proxy callback function 1228, which, invokes the appropriate event handler 246 passing in provided parameters and returns any results generated by the event handler, block 1128. If an appropriate event handler does not exist, compiler 230 generates and error, block 1128. In one embodiment, compiler 230 identifies the appropriate event handler and determines its existence by searching for a function in application 240 with a special name formed by appending the name of the associated event to the name of the associated proxy object variable specified in proxy object declaration 222. The names of the appropriate event and proxy object variable are extracted from meta-data 252.

Run-Time

Figure 13A:
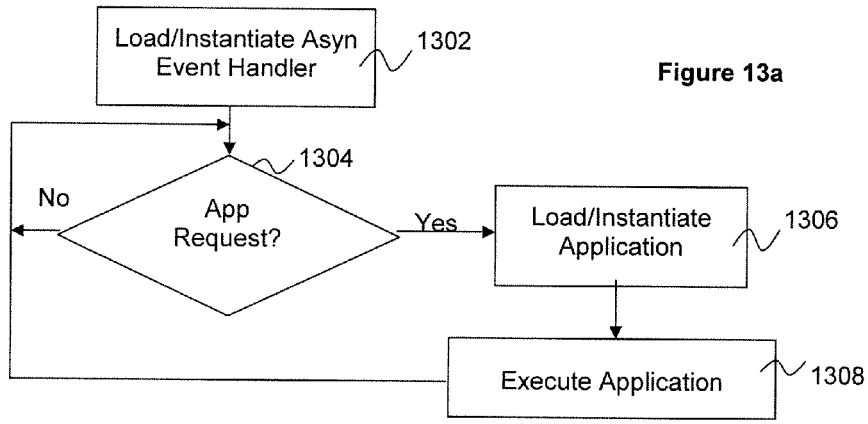
FIG. 13a illustrates the operational flow of the relevant aspects of the runtime environment of FIG. 2, in accordance with one embodiment.

FIG. 13a illustrates the relevant operational flow of runtime engine 250, in accordance with one embodiment. When the runtime engine 250 is first instantiated, it initializes the runtime environment, including in particular, the creation of an instance of asynchronous event router 256, block 1302. In one embodiment, asynchronous event router 256 is a server component that listens for messages using various networking protocols and forwards them to clients that have registered for events with matching characteristics (e.g., based on message address or content). In one embodiment, asynchronous event router 256 is a Java Servlet that listens for XML messages using Internet protocols, such as HTTP. In one embodiment, event router 256 listens for messages using queuing protocols, such as JMS.

Additional non-essential details of runtime engine 250 may be found in copending U.S. patent application Ser. No. 10/082,807, entitled "ANNOTATION BASED DEVELOPMENT PLATFORM FOR ASYNCHRONOUS WEB SERVICES", filed on Feb. 22, 2002, having at least partial common inventorship with the present application. The '807 specification is hereby fully incorporated by reference.

Upon initialization of the runtime environment, runtime engine 250 waits for requests to execute applications, block 1304. At block 1306, runtime engine 250 loads application 240, whose execution is requested (or creates a new instance of the application if the application has been previously loaded for an earlier execution request). After loading and/or creating an instance of application 220, execution engine 250 "executes" the application 220, or more specifically, transfers execution control to application 220.

Figure 13B:
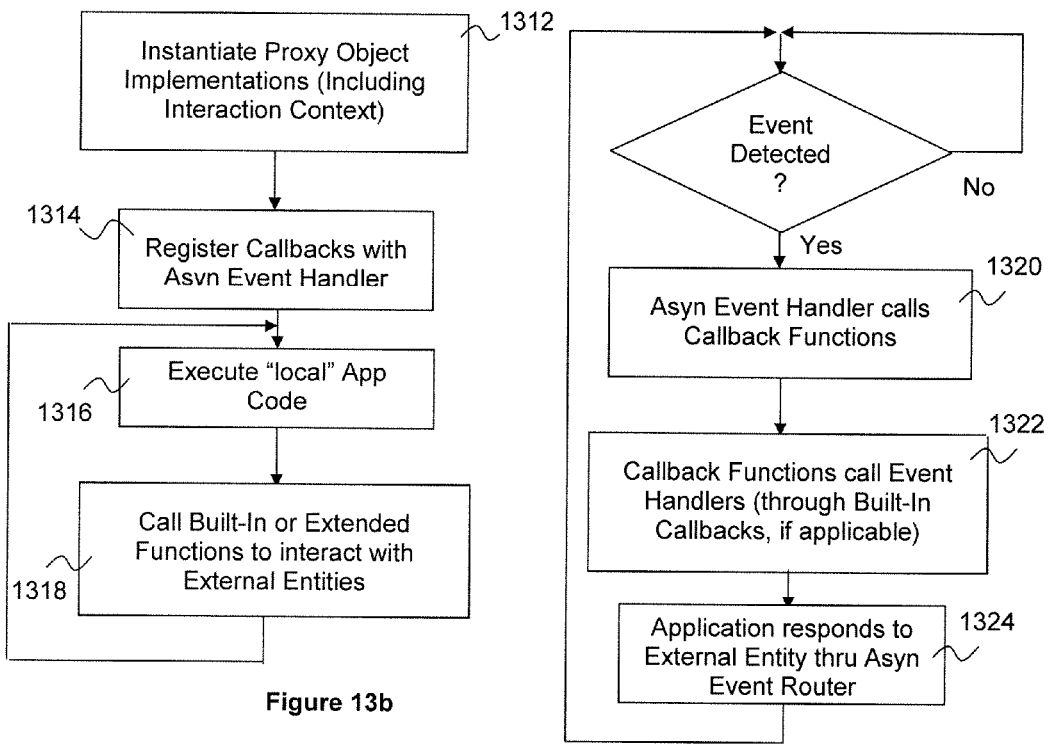
FIG. 13b illustrates an example execution flow.

FIG. 13b illustrates a typical execution flow, in accordance with one embodiment. As designated by compiler 230, if application 240 includes proxy initialization code 242 and so forth, proxy initialization code 242 executes prior to proxy invocation code 244 and event handling code 246.

As previously described, proxy initialization code 242 instantiates a proxy object for each proxy object declaration 222 and assigns the proxy object to the associated variable specified in proxy object declaration 222, block 1312. Then, proxy initialization code 242 registers all callbacks functions 208 declared in associated proxy object definitions 204 and implemented by proxy object 254 with asynchronous event router 256 as handlers for asynchronous events from external entity 202, block 1314.

Thereafter, execution engine 250 continues to execute application 240. In the course of execution, if application 240 has a need to interact with external entities, it invokes proxy object functions 1222-1224 using the associated variable declared in proxy object declaration 222, block 1318. As designated by compiler 230, proxy object functions 1222-1224 create an instance of proxy context object 258 associated with the invoked function using a function invocation ID. In one embodiment a separate thread is created for each function invocation and the thread ID is used as the function invocation ID.

Functions 2222 further invoke associated built-in functions 211 of proxy object implementation 210, block 1318. The behavior of built-in functions 211 varies for each proxy object implementation 210 and depends largely on the nature of associated external entity 202. If provided, proxy object functions 1224 invoke the "invoke" function 616 of proxy object implementation 210, block 1318.

In one embodiment, built-in functions send messages to external entity 202 via Internet or messaging protocols and optionally wait for a response. In one embodiment, if a response is received, built-in function 211 returns a representative result, which is in turn returned to proxy invocation code 244 inside application 240 by proxy object function 1222. In one embodiment, built-in functions include a callback location and proxy object instance identifier in messages sent to external entity 202 to facilitate the generation and routing of callback events generated by external entity 202.

Both built-in functions 211 and the "invoke" function 616 of extensible interface 218 may obtain a reference to the current proxy context object 258 for accessing meta-data 252 by calling the global getProxyContext( ) function provided by run-time engine 250. The getProxyContext( ) function finds and returns the appropriate context object based on the invocation ID associated with the current function invocation. In one embodiment, a separate thread is created for each function ID and the current invocation ID is the same as the current thread ID.

Like built-in functions 211, the behavior of invoke function 616 varies for each proxy object implementation 210 and depends largely on the nature of the associated external entity 202. In one embodiment, invoke function 616 accesses meta-data 252 via proxy context object 258 to determine the desired semantics of proxy object functions 1224, then sends appropriate messages to external entity 202, optionally waits for a response and returns a representative result to proxy object function 1224, which in turn returns the result to proxy invocation code 244 in application 240. In one embodiment, invoke function 616 includes a callback location and proxy object instance identifier in messages sent to external entity 202 to facilitate the generation and routing of callback events generated by external entity 202.

Upon receiving a request from application 240, external entity 202 handles the request in an application dependent manner and optionally records a callback address and instance identifier provided by the request. External entity 202 may generate asynchronous events detectable by asynchronous event handler 256 and may specify the recorded callback address and instance identifier to facilitate handling of the event. In one embodiment, external entity 202 provides event notifications to asynchronous event router 256 in the form of messages.

At block 1320, as asynchronous event router 256 detects an event from external entity 202, it checks its list of registered handlers and invokes the designated callback function 1226-1228 of the designated proxy object passing a representation of the event as a set of parameters. In one embodiment, asynchronous event router 256 uses a provided callback location to identify which registered handler and callback function should handle the event. In one embodiment, asynchronous event router 256 uses a provided instance identifier to determine which instance of the identified handler should receive the callback.

As designated by compiler 230, at block 1324, proxy object callbacks 1226 invoke associated built-in callbacks 212 of proxy object implementation 210 passing along any provided parameters, block 1322. The behavior of built-in callbacks 212 varies for each proxy object implementation 210 and depends largely on the nature of associated external entity 202.

In one embodiment built-in callback 212 may invoke an appropriate event handler 246 in application 240 passing provided parameters and optionally wait for a response, block 1322.

Upon receipt of a response to the event for external entity 202, built-in callback 212 returns any returned result to proxy object callback function 1226, which returns it to asynchronous event router 252, which provides the result to external entity 202, block 1324. In one embodiment, the result is returned to the external entity in the form of a representative message.

Also as designated by the compiler, proxy object callbacks 1228 do not have corresponding built-in callbacks 212 and are therefore forwarded directly to appropriate event handlers 246 with any corresponding results returned optionally to external entity 202 via proxy callback function 1228 and asynchronous event router 256, block 1324.

In one embodiment, appropriate event handlers 246 are identified as specially named functions defined in application 240. In one embodiment, this naming convention is determined by appending the name of proxy callback function 1226-1228 corresponding to callback declarations 208 to the name of the proxy object variable declared in proxy object declaration 222 in application code 220.

Managing n-Way Relationships

For some applications, there is a need to manage an n-way interaction with an external entity. I.e., a single instance of application 240 may need to simultaneously interact with multiple instances of external entity 202. The required number of instances may vary based on run-time data; therefore, it may not be possible to determine how many proxy object instances will be required when application code 220 is written. For example, an application instance may have a need to disassemble the line items of a purchase order and conduct a concurrent conversation with a separate instance of the external entity for each line item.

In various embodiments, to address this need, the application developer may specify a proxy object factory in proxy object declaration 222 instead of specifying a single proxy object. For these embodiments, compiler 230 automatically generates a "factory class" for each proxy object 254. For example, for a proxy object 254 named MyService, a factory class (not separately shown) by the name MyServiceFactory is automatically generated. FIG. 14a illustrates an example proxy object factory declaration in one embodiment corresponding to the "Timer" proxy object definition illustrated in FIG. 5.

In some or all of these embodiments, the automatically generated proxy object factory may include a create( ) function to enable application 240 to control the creation of new proxy object instances and a destroy( ) function to enable application 240 to control the destruction of previously created proxy object instances. As such, application 240 may create as many instances of the proxy object as required at run-time. FIG. 14b illustrates how application code 220 might use the create( ) function in one embodiment to generate a new instance of the "Timer" proxy object and use the resulting proxy object to interact with the associated external entity.

Each automatically generated proxy object factory may be used by a software application to interact with the corresponding external entity in a n-way interaction, substantially as earlier described for the singleton case, referencing FIGS. 9a-9c. The proxy object factory behaves as if the annotations (i.e. usage specifications) were in front of instances created by the proxy object factory.

To facilitate proper asynchronous event routing, developer of application code 220 names associated event handlers 224 using the name of the proxy object factory variable instead of a proxy object variable name. In addition, the developer specifies a "proxy object instance" variable as a predetermined parameter, e.g. the first parameter, of each event handler 224. Proxy object 254 will provide the appropriate proxy object instance for each callback event, so application 240 may determine which instance of external entity 202 generated the event and interact with it using the provided proxy object instance. FIG. 14c illustrates an event handler 224 in one embodiment developed to handle asynchronous events from Timer proxy objects generated by the proxy object factory named "manyTimers" declared in FIG. 14a. As illustrated, on invocation, the first argument "t" will reference the specific instance of the Timer proxy object associated with the instance of the external entity that generated the event.

Example Computer System

Figure 15:
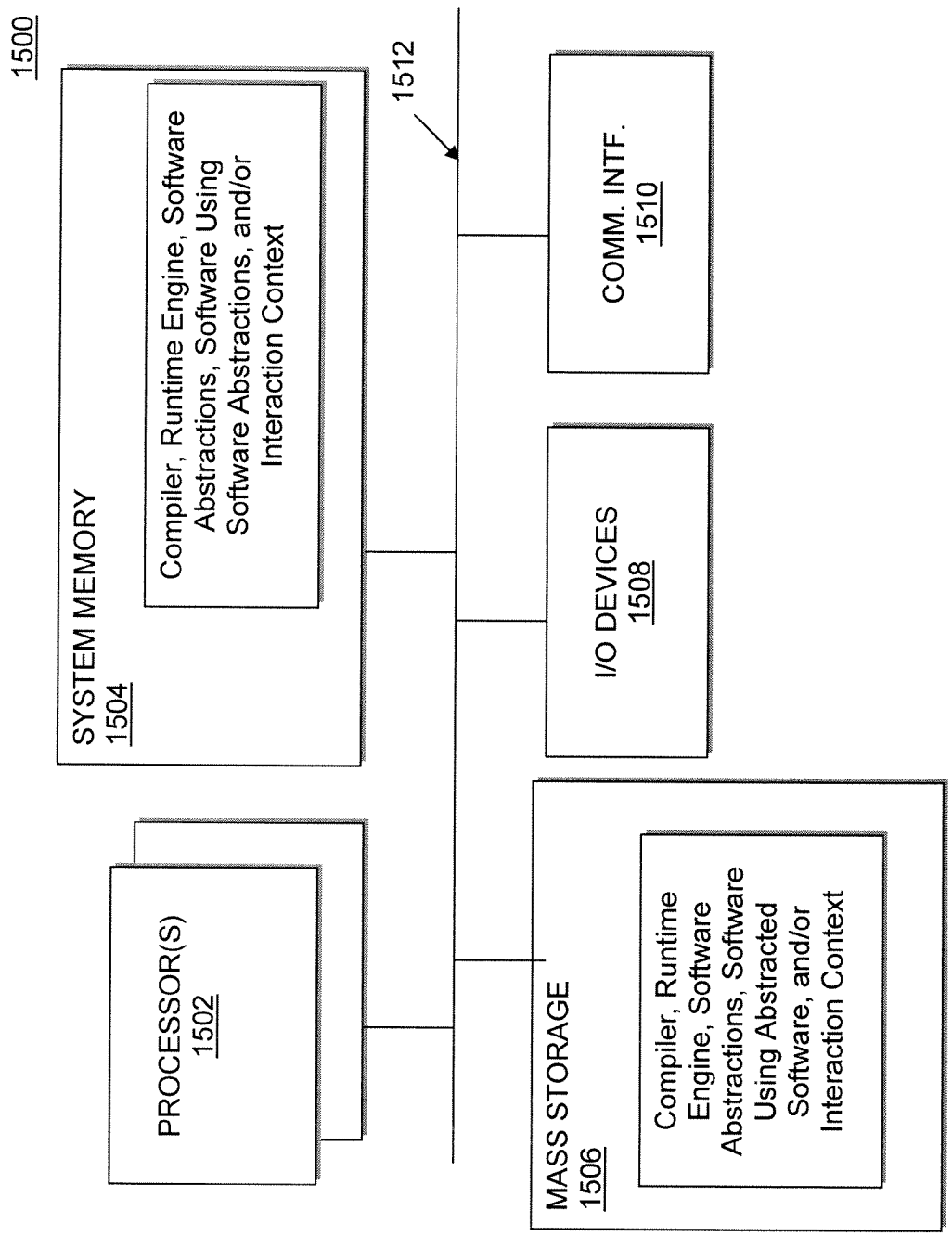
FIG. 15 illustrates an example computer system suitable for use to practice the present invention, in accordance with one embodiment.

FIG. 15 illustrates an example computer system suitable for use to practice the present invention, in accordance with one embodiment. Depending on the size, capacity or power of the various elements, example computer system 1500 may be used to host the software abstraction of an external entity 202, and/or implementations of the software abstractions of external entities 202 during runtime.

Example computer system 1500 may also be used to host the development of application 220 that programmatically interacts with abstracted external entity 202, including its compilation, or execution of application 240 during runtime.

As shown, computer system 1500 includes one or more processors 1502, and system memory 1504. Additionally, computer system 1500 includes mass storage devices 1506 (such as diskette, hard drive, CDROM and so forth), input/output devices 1508 (such as keyboard, cursor control and so forth) and communication interfaces 1510 (such as network interface cards, modems and so forth). The elements are coupled to each other via system bus 1512, which represents one or more buses. In the case of multiple buses, they are bridged by one or more bus bridges (not shown).

Each of these elements performs its conventional functions known in the art.

In particular, system memory 1504 and mass storage 1506 are employed to store a working copy and a permanent copy of the programming instructions implementing the various aspects of the present invention, i.e. the software abstractions of external entities 202, implementations of the software abstractions 210, applications 220, compiler 230, and/or runtime engine 250. System memory 1504 and mass storage 1506, separately or together, function as a computer or machine readable medium. The permanent copy of the programming instructions may be loaded into mass storage 1506 in the factory, or in the field, through e.g. a distribution medium (not shown) or through communication interface 1510 (from a distribution server (not shown)).

The constitution of these elements 1502-1512 are known, and accordingly will not be further described

CONCLUSION AND EPILOGUE

Thus, it can be seen from the above descriptions, a novel method and apparatus for simplifying the development, customization and use of software abstractions for interacting with external entities from within a software application has been described. The present invention advantageously assists a software developer to develop software that interacts with a variety of other external entities, without necessarily requiring the software developer to learn a large number of new paradigms or acquire a large number of new techniques.

While the present invention has been described in terms of the above described embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A method for creating a proxy object capable of communication with an external entity, comprising:
   specifying a proxy object definition for the proxy object wherein the proxy object definition defines a first function for communicating with the external entity;
   specifying at least one implementation class for the proxy object definition, wherein the at least one implementation class does not implement the first function; and
   wherein the at least one implementation class includes functionality to support one of: proxy object design, software compilation or software execution;
   wherein the proxy object comprises function interfaces and callback interfaces declared by proxy object definitions, and a proxy object implementation that includes built-in functions for initiating interaction with the external entity, built-in callbacks for handling asynchronous events from the external entity, and an invoke function for handling invocations to function interfaces that do not have a corresponding built-in function;
   wherein an invocation of the first function on the external entity comprises an invocation of the invoke function of the proxy object implementation; and
   registering the proxy object with an asynchronous event router, wherein the asynchronous event router receives and routes the asynchronous events to an appropriate proxy object.

2. The method of claim 1, further comprising:
   compiling the proxy object definition and/or the at least one implementation class.

3. The method of claim 1 wherein:
   the at least one implementation class is specified with a source code annotation.

4. The method of claim 1, further comprising:
   specifying at least one callback declaration.

5. The method of claim 1 wherein:
   the functionality to support proxy object design includes a wizard that can guide the creation of the proxy object.

6. The method of claim 1 wherein:
   the functionality to support software compilation includes at least one function to validate function calls and property settings in source code.

7. The method of claim 1 wherein:
   the functionality to support software execution includes at least one function to acquire and release at least one resource and includes the ability to invoke a function on the external entity.

8. The method of claim 1 wherein:
   the external entity can be one of: a database, a legacy system, or a software application.

9. The method of claim 1 wherein:
   the proxy object can inherit from a proxy object interface declaration at least one of: a function, a property or a callback.

10. The method of claim 1 wherein:
    the proxy object definition includes a declaration of the first function.

11. A system for creating a proxy object capable of communication with an external entity, comprising:
    a processor;
    a memory configured to store instructions;
    an asynchronous event router configured to register the proxy object with an asynchronous event router, wherein the asynchronous event router receives and routes asynchronous events to the proxy object;
    a proxy object definition associated with the proxy object wherein the proxy object definition defines a first function for communicating with the external entity;
    at least one implementation class associated with the proxy object definition, wherein the at least one implementation class does not implement the first function;
    a compiler configured to compile the proxy object definition and the at least one implementation class;
    wherein the at least one implementation class includes functionality to support one of: proxy object design, software compilation or software execution;
    wherein the proxy object is an abstraction of the external entity and provides uniform access to the external entity and comprises function interfaces and callback interfaces declared by proxy object definitions, and a proxy object implementation that includes built-in functions for initiating interaction with the external entity, built-in callbacks for handling asynchronous events from the external entity, and an invoke function for handling invocations to function interfaces that do not have a corresponding built-in function; and
    wherein an invocation of the first function on the external entity comprises an invocation of the invoke function of the proxy object implementation.

12. The system of claim 11, wherein: the compiler is further configured to generate metadata that can be used by the proxy object at runtime to invoke the first function.

13. The system of claim 11 wherein:
    the at least one implementation class is specified with a source code annotation.

14. The system of claim 11, further comprising:
    at least one callback declaration.

15. The system of claim 11 wherein:
    the functionality to support proxy object design includes a wizard that can guide the creation of the proxy object.

16. The system of claim 11 wherein:
    the functionality to support software compilation includes at least one function to validate function calls and property settings in source code.

17. The system of claim 11 wherein:
    the functionality to support software execution includes at least one function to acquire and release at least one resource and includes the ability to invoke a function on the external entity.

18. The system of claim 11 wherein:
    the external entity can be one of: a database, a legacy system, or a software application.

19. The system of claim 11 wherein:
    the proxy object can inherit from a proxy object interface declaration at least one of: a function, a property or a callback.

20. The system of claim 11 wherein:

the proxy object definition includes a declaration of the first function.

21. A non-transitory computer-readable medium having instructions stored thereon that when executed by a processor cause a system to create a proxy object capable of communication with an external entity, the creating the proxy object comprising:
specifying a proxy object definition for the proxy object wherein the proxy object definition defines a first function for communicating with the external entity;
specifying at least one implementation class for the proxy object definition, wherein the at least one implementation class does not implement the first function; and
wherein the at least one implementation class includes functionality to support one of: proxy object design, software compilation or software execution;
wherein the proxy object comprises function interfaces and callback interfaces declared by proxy object definitions, and a proxy object implementation that includes built-in functions for initiating interaction with the external entity, built-in callbacks for handling asynchronous events from the external entity, and an invoke function for handling invocations to function interfaces that do not have a corresponding built-in function;
wherein an invocation of the first function on the external entity comprises an invocation of the invoke function of the proxy object implementation; and
registering the proxy object with an asynchronous event router, wherein the asynchronous event router receives and routes the asynchronous events to an appropriate proxy object.

22. The non-transitory computer-readable medium of claim 21, the creating the proxy object further comprising the proxy object definition or the at least one implementation class.

23. The non-transitory computer-readable medium of claim 21, wherein the at least one implementation class is specified with a source code annotation.

* * * * *

UNITED STATES PATENT AND TRADEMARK OFFICE
CERTIFICATE OF CORRECTION

| | | |
|---|---|---|
| PATENT NO. | : 8,484,664 B2 | Page 1 of 1 |
| APPLICATION NO. | : 13/195284 | |
| DATED | : July 9, 2013 | |
| INVENTOR(S) | : Marvin et al. | |

It is certified that error appears in the above-identified patent and that said Letters Patent is hereby corrected as shown below:

In the Specification

In column 8, line 53, delete "n" and insert -- an --, therefor.

In column 18, line 62, delete "described" and insert -- described. --, therefor.

Signed and Sealed this
Twenty-ninth Day of October, 2013

Teresa Stanek Rea
*Deputy Director of the United States Patent and Trademark Office*